United States Patent
Cao et al.

(10) Patent No.: US 12,021,673 B2
(45) Date of Patent: *Jun. 25, 2024

(54) GENERATION AND TRANSMISSION OF PHYSICAL LAYER DATA UNITS IN A COMPOSITE COMMUNICATION CHANNEL IN A VEHICULAR COMMUNICATION NETWORK

(71) Applicant: Marvell Asia Pte Ltd, Singapore (SG)

(72) Inventors: Rui Cao, Fremont, CA (US);
Hongyuan Zhang, Fremont, CA (US);
Liwen Chu, San Ramon, CA (US);
Prashant Sharma, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,985

(22) Filed: Jan. 26, 2023

(65) Prior Publication Data

US 2023/0171139 A1 Jun. 1, 2023

Related U.S. Application Data

(63) Continuation of application No. 16/844,727, filed on Apr. 9, 2020, now Pat. No. 11,665,036.
(Continued)

(51) Int. Cl.
*H04L 27/26* (2006.01)
*H04L 5/00* (2006.01)
(Continued)

(52) U.S. Cl.
CPC ........ *H04L 27/2602* (2013.01); *H04L 5/0007* (2013.01); *H04L 5/0023* (2013.01);
(Continued)

(58) Field of Classification Search
CPC . H04L 27/2602; H04L 5/0007; H04L 5/0023; H04L 5/0044; H04L 27/2603;
(Continued)

(56) References Cited

U.S. PATENT DOCUMENTS 6,115,354 A 9/2000 Weck
6,721,294 B1 4/2004 Bahrenburg et al.
(Continued)

FOREIGN PATENT DOCUMENTS

WO 2016170505 A1 10/2016

OTHER PUBLICATIONS

U.S. Appl. No. 62/728,633, filed Sep. 7, 2018.
(Continued)

*Primary Examiner* — Yu-Wen Chang

(57) ABSTRACT

A communication device performs a backoff procedure for a duration of time to determine whether a first sub-channel of a communication channel and a second sub-channel of the communication channel are available for transmission by the communication device. The first sub-channel is designated as a primary channel and the second sub-channel is designated as a secondary channel. Performing the backoff procedure includes using a single backoff counter, and starting and stopping the backoff counter based on sensing the first sub-channel and sensing the second sub-channel.

20 Claims, 7 Drawing Sheets

Related U.S. Application Data

(60) Provisional application No. 62/845,749, filed on May 9, 2019, provisional application No. 62/831,593, filed on Apr. 9, 2019.

(51) Int. Cl.
  *H04W 4/40* (2018.01)
  *H04W 72/0453* (2023.01)
  *H04W 80/02* (2009.01)

(52) U.S. Cl.
  CPC ........ *H04L 5/0044* (2013.01); *H04L 27/2603* (2021.01); *H04W 4/40* (2018.02); *H04W 72/0453* (2013.01); *H04W 80/02* (2013.01); *H04L 5/0048* (2013.01)

(58) Field of Classification Search
  CPC ... H04L 5/0048; H04L 5/001; H04L 27/2614; H04W 4/40; H04W 72/0453; H04W 80/02; H04W 16/14; H04W 76/14
  See application file for complete search history.

(56) References Cited

U.S. PATENT DOCUMENTS

| | | | |
|---|---|---|---|
| 8,867,653 | B2 | 10/2014 | Zhang et al. |
| 8,942,311 | B2 | 1/2015 | Zhang et al. |
| 9,088,376 | B2 | 7/2015 | Laulainen et al. |
| 9,119,186 | B2 | 8/2015 | Zhang et al. |
| 9,246,738 | B2 | 1/2016 | Zhang et al. |
| 10,623,533 | B2 | 4/2020 | Chu et al. |
| 11,665,036 | B2 | 5/2023 | Cao et al. |
| 2012/0236971 | A1 | 9/2012 | Taghavi et al. |
| 2012/0289274 | A1 | 11/2012 | Matsuo et al. |
| 2012/0327871 | A1 | 12/2012 | Ghosh et al. |
| 2013/0077463 | A1 | 3/2013 | Zhang |
| 2013/0089047 | A1 | 4/2013 | Wentink |
| 2013/0128807 | A1 | 5/2013 | Vermani et al. |
| 2013/0286961 | A1 | 10/2013 | Vermani et al. |
| 2015/0146653 | A1 | 5/2015 | Zhang et al. |
| 2015/0163824 | A1* | 6/2015 | Krzymien ............ H04B 17/382 370/338 |
| 2015/0256304 | A1 | 9/2015 | Porat |
| 2016/0014725 | A1 | 1/2016 | Yu et al. |
| 2016/0021661 | A1 | 1/2016 | Yerramalli et al. |
| 2016/0021678 | A1 | 1/2016 | Merlin et al. |
| 2016/0081010 | A1 | 3/2016 | Seok |
| 2016/0095040 | A1 | 3/2016 | Valliappan et al. |
| 2016/0112547 | A1 | 4/2016 | Porat |
| 2016/0119452 | A1 | 4/2016 | Lee |
| 2016/0150534 | A1* | 5/2016 | Kwon ............... H04W 72/0446 370/338 |
| 2016/0330714 | A1 | 11/2016 | Hedayat |
| 2016/0366699 | A1 | 12/2016 | Zhang et al. |
| 2017/0012748 | A1 | 1/2017 | Dabeer et al. |
| 2017/0126456 | A1 | 5/2017 | Lee et al. |
| 2017/0310514 | A1 | 10/2017 | Zhang et al. |
| 2017/0347370 | A1 | 11/2017 | Kneckt et al. |
| 2018/0233996 | A1 | 8/2018 | Zhu et al. |
| 2018/0254861 | A1 | 9/2018 | Cherian et al. |
| 2018/0317128 | A1 | 11/2018 | Chun et al. |
| 2018/0359066 | A1 | 12/2018 | Mu et al. |
| 2019/0123863 | A1 | 4/2019 | Zhang et al. |
| 2019/0173710 | A1 | 6/2019 | Cao et al. |
| 2019/0199491 | A1 | 6/2019 | Verma et al. |
| 2019/0261352 | A1 | 8/2019 | Cariou et al. |
| 2019/0280919 | A1 | 9/2019 | Sadeghi et al. |
| 2019/0297146 | A1 | 9/2019 | Noh et al. |
| 2020/0037385 | A1 | 1/2020 | Park et al. |
| 2020/0092402 | A1 | 3/2020 | Cao et al. |
| 2020/0374907 | A1 | 11/2020 | Viger et al. |
| 2020/0389798 | A1 | 12/2020 | Zakrzewska et al. |
| 2021/0258103 | A1* | 8/2021 | Wei ...................... H04L 1/0008 |

OTHER PUBLICATIONS

U.S. Appl. No. 62/675,906, filed May 24, 2018.
International Search Report and Written Opinion in International Patent Application No. PCT/US2020/027547, dated Jul. 2, 2020 (25 pages).
Lim et al., "Consideration on Features for 11bd," LG Electronics, IEEE Draft doc. IEEE 802.11-19/000940, 15 pages (Jan. 13, 2019).
Cao et al., "Potential PHY Designs for NGV," Marvell, IEEE draft doc. IEEE 802.11-19/0016r0, 30 pages (Jan. 14, 2019).
Jang et al., "20MHz Channel Access in 11bd," LG Electronics, IEEE draft doc. IEEE 802.11-19/0366r1, 36 pages (Mar. 11, 2019).
Lim et al., "PHY Designs for 11bd," LG Electronics, IEEE draft doc. IEEE 802.11-19/332r2, 24 pages (Mar. 10, 2019).
Cao et al., "11bd Frame Format," Marvell, IEEE Draft doc. IEEE 8O2.11-19/0342r0, 11 pages (Mar. 11, 2019).
IEEE P802.11 ax™/D1.4, "Draft Standard for Information technology— Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).
IEEE P802.11 ax™/D2.2, "Draft Standard for Information technology— Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).
IEEE P802.11 ax™/D4.0, "Draft Standard for Information technology— Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).
IEEE P802.11 ax™/D5.0, "Draft Standard for Information technology— Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).
IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
Sadeghi, "802.11bd Specification Framework Document," rev. 5, doc. No. IEEE 802.11-15/0132r05, The Institute of Electrical and Electronics Engineers, Nov. 19, 2019 (9 pages).
Zhang et al., "802.11 for Next Generation V2X Communication," IEEE draft 802.11-18/0513r2, 29 pages (Mar. 6, 2018).
U.S. Appl. No. 62/517,724, Timofeev et al., "MIMO-OFDM Midamble with Compressed HE-LTF," filed Jun. 9, 2017.
Search Report for Chinese Application No. 202080038750.1 mailed Dec. 26, 2023. (3 pages).
Lim, et al., "Consideration on Features for 11bd," IEEE Doc. No. 802.11-19/0009r0, LG Electronics, Jan. 13, 2019. (15 pages).
First Office Action for Chinese Application No. 202080038750.1 mailed Dec. 26, 2023. (18 pages).
Jang, et al., "20 MHz Channel Access in 11bd," IEEE Doc No. 802.11-19/0366r2, LG Electronics, Mar. 2019. (14 pages).

* cited by examiner

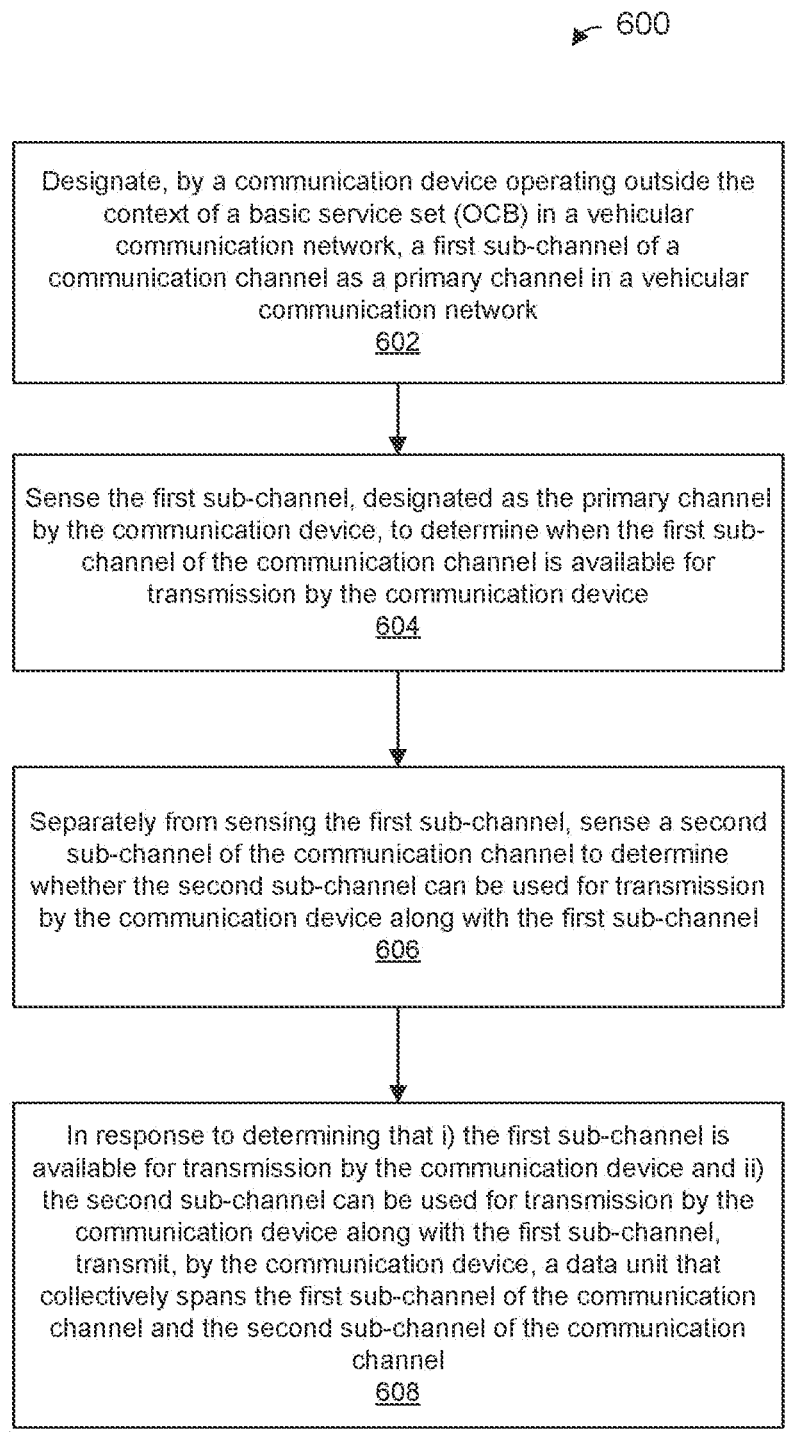

GENERATION AND TRANSMISSION OF PHYSICAL LAYER DATA UNITS IN A COMPOSITE COMMUNICATION CHANNEL IN A VEHICULAR COMMUNICATION NETWORK

CROSS-REFERENCES TO RELATED APPLICATIONS

The present application is a continuation of U.S. application Ser. No. 16/844,727, filed on Apr. 9, 2020, entitled "GENERATION AND TRANSMISSION OF PHYSICAL LAYER DATA UNITS IN A COMPOSITE COMMUNICATION CHANNEL IN A V," which claims the benefit of U.S. Provisional Patent Application No. 62/831,593, entitled "NEXT GENERATION WIRELESS 20 MHZ OPERATION," filed on Apr. 9, 2019, and U.S. Provisional Patent Application No. 62/845,749, entitled "NEXT GENERATION WIRELESS 20 MHZ OPERATION," filed on May 9, 2019. All of the applications referenced above are incorporated herein by reference in their entireties.

FIELD OF THE DISCLOSURE

The present disclosure relates generally to communication networks and, more particularly, to physical layer protocol data units.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

The IEEE 802.11p Standard specifies protocols for wireless access in vehicular environments (WAVE). Future WAVE standards are aimed at delivering improved car-to-car or car-to-infrastructure connectivity, throughput, infotainment features, etc. The IEEE 802.11p Standard is largely based on the IEEE 802.11a Standard, and does not support more advanced features, such as operation with composite communication channels, that are defined by IEEE 802.11n and later standards. Implementation of such features in vehicular communication networks presents various challenges due the peculiar nature of communications in vehicular environments.

SUMMARY

In an embodiment, a method for wireless communication in a vehicular communication network includes: generating, by a communication device, a physical layer (PHY) preamble to be included in a PHY protocol data unit (PPDU) for transmission in a communication channel in the vehicular communication network, including generating the PHY preamble to include a legacy portion decodable by a legacy communication device operating in the vehicular communication network; generating, by the communication device, a data portion of the PPDU; performing, by the communication device, a backoff procedure for a duration of time to determine whether a first sub-channel of the communication channel and a second sub-channel of the communication channel are available for transmission by the communication device, wherein the first sub-channel is designated as a primary channel and the second sub-channel is designated as a secondary channel. Performing the backoff procedure includes, for the duration of time of the backoff procedure: sensing the first sub-channel of the communication channel, designated as the primary channel, to determine when the first sub-channel is available for transmission by the communication device, the sensing including determining whether energy detected by the communication device in the first sub-channel is below a first value of an energy detection threshold; sensing the second sub-channel, designated as the secondary channel, to determine when the second sub-channel is available for transmission by the communication device along with the first sub-channel, the sensing including determining whether energy detected by the communication device in the second sub-channel is below a second value of the energy detection threshold, wherein the second value of the energy detection threshold used for sensing the secondary channel is the same as the first value of the energy detection threshold used for sensing the primary channel; counting down a backoff counter while performing the sensing of the first sub-channel and the sensing of the second sub-channel; pausing the counting down of the backoff counter in response to determining, based on the sensing of the first sub-channel, that the first sub-channel is not available for transmission; pausing the counting down of the backoff counter in response to determining, based on the sensing of the second sub-channel, that the second sub-channel is not available for transmission; and resuming the counting down of the backoff counter when both i) determining, based on the sensing of the first sub-channel, that the first sub-channel is available for transmission, and ii) determining, based on the sensing of the second sub-channel, that the second sub-channel is available for transmission. The method further includes: in response to determining that i) the first sub-channel is available for transmission by the communication device and ii) the second sub-channel can be used for transmission by the communication device along with the first sub-channel, transmitting, by the communication device, the PPDU using the first sub-channel and the second sub-channel in the vehicular communication network in connection with the backoff counter reaching zero.

In another embodiment, a communication device is configured to operate in a vehicular communication network. The communication device comprises a wireless network interface device having one or more integrated circuit (IC) devices. The one or more IC devices are configured to: generate a PHY preamble to be included in a PPDU for transmission in a communication channel in the vehicular communication network, including generating the PHY preamble to include a legacy portion decodable by a legacy communication device operating in the vehicular communication network. The one or more IC devices are further configured to: generate a data portion of the PPDU; and perform a backoff procedure for a duration of time to determine whether a first sub-channel of the communication channel and a second sub-channel of the communication channel are available for transmission by the communication device, wherein the first sub-channel is designated as a primary channel and the second sub-channel is designated as a secondary channel. Performing the backoff procedure include, for the duration of time of the backoff procedure: sensing the first sub-channel of the communication channel, designated as the primary channel, to determine when the first sub-channel is available for transmission by the communication device, the sensing including determining whether energy detected by the communication device in the first sub-channel is below a first value of an energy detection threshold; sensing the second sub-channel, designated as the secondary channel, to determine when the second sub-channel is available for transmission by the communication device along with the first sub-channel, the sensing including determining whether energy detected by the communication device in the second sub-channel is below a second value of the energy detection threshold, wherein the second value of the energy detection threshold used for sensing the secondary channel is the same as the first value of the energy detection threshold used for sensing the primary channel; counting down a backoff counter while performing the sensing of the first sub-channel and the sensing of the second sub-channel; pausing the counting down of the backoff counter in response to determining, based on the sensing of the first sub-channel, that the first sub-channel is not available for transmission; pausing the counting down of the backoff counter in response to determining, based on the sensing of the second sub-channel, that the second sub-channel is not available for transmission; and resuming the counting down of the backoff counter when both i) determining, based on the sensing of the first sub-channel, that the first sub-channel is available for transmission, and ii) determining, based on the sensing of the second sub-channel, that the second sub-channel is available for transmission. The one or more IC devices are further configured to control the wireless network interface device to, in response to determining that i) the first sub-channel is available for transmission by the communication device and ii) the second sub-channel can be used for transmission by the communication device along with the first sub-channel, transmit the PPDU using the first sub-channel and the second sub-channel in the vehicular communication network in connection with the backoff counter reaching zero.

BRIEF DESCRIPTION OF THE DRAWINGS

FIG. 6 is a flow diagram of an example method for accessing a composite communication channel in the vehicular communication network of FIG. 1, according to an embodiment.

DETAILED DESCRIPTION

Figure 1:
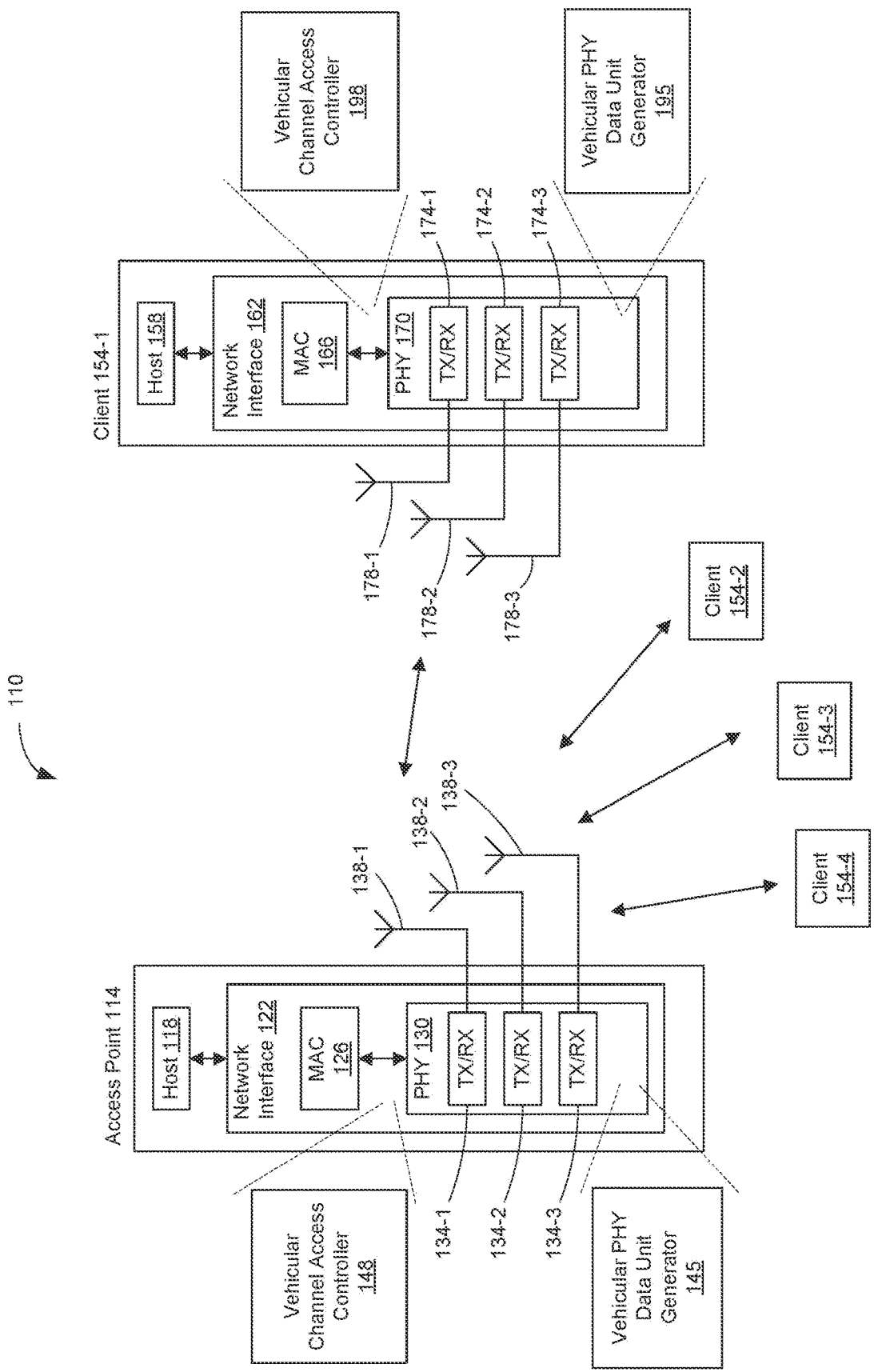
FIG. 1 is a block diagram of an example vehicular communication network, according to an embodiment.

Channel access techniques and physical layer (PHY) data unit formats, as described below, are discussed in the context of wireless access in vehicular environments (WAVE) communication systems that utilize protocols similar to protocols defined by the 802.11 Standard from the Institute of Electrical and Electronics Engineers (IEEE) merely for explanatory purposes. In other embodiments, however, the channel access techniques and PHY data unit formats are utilized in other types of wireless communication systems such as personal area networks (PANs), mobile communication networks such as cellular networks, metropolitan area networks (MANs), satellite communication networks, etc.

In embodiments described below, a vehicular communication network includes communication devices, such access points and client stations, that operate according to one or more protocols that define wireless access in vehicular environments (WAVE) communications. In an embodiment, the access points are embedded in roadside units and the client stations are embedded in moving vehicles operating in the vehicular communication network. In an embodiment, the client stations communicate that are operating in the vehicular communication network communicate with other client stations and/or roadside units to exchange information, such as safety warnings, traffic information, etc. that may enhance safety, improve driving experience, etc. of the moving vehicle, in an embodiment. The vehicular communication network supports operation according to a first communication protocol that defines WAVE communication, in an embodiment. In an embodiment, the vehicular communication network additionally supports operating according to a second communication protocol that defines WAVE communication. In an embodiment, the second communication protocol is a legacy protocol with respect to the first communication protocol. In an embodiment, the first communication protocol is the IEEE 802.11bd Standard, now in the process of being standardized, and the second communication protocol is the IEEE 802.11p Standard. In other embodiments, the first communication protocol is a suitable communication protocol different from the IEEE 802.11bd Standard and/or the second communication protocol is a suitable communication protocol different from the IEEE 802.11p Standard.

In an embodiment, the first communication protocol supports communication in the vehicular communication network over composite communication channels that have wider bandwidths as compared to a narrower communication channel bandwidth supported by the second communication protocol. In an embodiment, a composite communication channel in the vehicular communication network includes multiple component channels, each component channel having the narrower bandwidth supported by the second communication protocol. The composite communication channel supported by the first communication protocol increases throughput as compared to the highest throughout supported by the second communication protocol, in at least some embodiments.

The vehicular communication network includes one or more "non-legacy" communication devices that are configured to operate according to at least the first communication protocol, in an embodiment. The vehicular communication network additionally includes at least one "legacy" communication device that is configured to operate according to the second communication protocol, but not the first communication protocol. In an embodiment, a non-legacy communication device operating in the vehicular communication network is configured to, in at least some situations, generate, transmit, receive and decode data units that span all component channels of the composite communication channel and/or is configured to generate, transmit, receive and decode data units that span a narrower communication channel that includes some (e.g., one) but not all component channels of the composite communication channel. In an embodiment, a legacy communication device operating in the vehicular communication network is configured to generate, transmit, receive and decode data units that span a narrower communication channel that includes some (e.g., one) but not all component channels of the composite communication channel, but is not configured to generate, transmit, receive and decode data units that span all of the component channels of the communication channel. In various embodiments, data unit formats described herein provide interoperability and backwards compatibility between i) non-legacy communication devices that are operating using the composite communication channel that includes all component channels of the composite communication channel, ii) non-legacy communication devices that are operating using a narrower communication channel that includes some (e.g., one) but not all component channels of the composite communication channel and iii) legacy communication devices that are operating using the narrower communication channel that includes some (e.g., one) but not all component channels of the composite communication channel.

In at least some embodiments, communication devices in the vehicular communication network operate in an outside of the context of a basic service set (BSS) (OCB) mode in which the communication devices operate without first associating with a BSS. OCB operation is suitable for vehicular communication because vehicular environments are typically rapidly varying, with communications between devices occurring for relatively short periods of time, in at least some situations, in various embodiments.

In current wireless local area networks, a composite communication channel used for communication in a BSS typically includes a component channel that is designated as a primary channel of the BSS. In such wireless local area networks, communication devices that are associated with a BSS utilize the component channel of the composite communication channel that is designated as the primary channel of the BSS for various operations in the BSS, including for channel access procedures for contending for access to the communication medium of the BSS. In current wireless local area networks, because all communication devices that are operating in a BSS generally use a same primary channel for channel access operations in the BSS, channel access fairness between the communication devices operating in the BSS is maintained. Composite communication channel access techniques described herein facilitate channel access fairness in OCB environments in which communication devices operate without associating with a BSS, and without necessarily sharing a primary channel for composite channel access operations between communication devices operating in the vehicular communication network.

FIG. 1 is a block diagram of an example vehicular communication network 110, according to an embodiment. The vehicular communication network 110 includes an access point (AP) 114. The AP 114 corresponds to a roadside unit operating in the vehicular communication network, in an embodiment. The AP 114 comprises a host processor 118 coupled to a network interface device 122. The network interface device 122 includes a medium access control (MAC) processor 126 and a PHY processor 130, in an embodiment The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a greater number of antennas 138 than transceivers 134, and antenna switching techniques are utilized. In one embodiment, the MAC processor 126 and the PHY processor 130 are configured to operate according to at least the first communication protocol (e.g., the IEEE 802.11bd Standard). In another embodiment, the MAC processor 126 and the PHY processor 130 are also configured to operate according to the second communication protocol (e.g., the IEEE 802.11p Standard).

The network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network interface device 122 may be implemented, at least partially, on a second IC. As another example, the host processor 118 and at least a portion of the network interface device 122 may be implemented on a single IC.

In various embodiments, the MAC processor 126 and/or the PHY processor 130 of the AP 114 are configured to generate data units, and process received data units, that conform to the first communication protocol. For example, the MAC processor 126 is configured to implement MAC layer functions, including MAC layer functions of the first communication protocol, and the PHY processor 130 is configured to implement PHY functions, including PHY functions of the first communication protocol. For instance, the MAC processor 126 is configured to generate MAC layer data units such as MAC service data units (MSDUs), MPDUs, A-MPDUs, etc., and provide the MAC layer data units to the PHY processor 130.

The PHY processor 130 is configured to receive MAC layer data units from the MAC processor 126 and to encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes one or more forward error correction (FEC) encoders (e.g., a binary convolutional code (BCC) encoder, a low density parity check (LDPC) encoder, etc.), one or more FEC decoders (e.g., a BCC decoder, an LDPC decoder, etc.), amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the network interface 122 includes a vehicular PHY data unit generator 145 that is configured to generate PPDUs for transmission in composite communication channels in vehicular communication networks, according to an embodiment. In an embodiment, the PHY processor 130 includes the vehicular PHY data unit generator 145. In an embodiment, the vehicular PHY data unit generator 145 is configured to generate PPDUs, for transmission in composite communication channels in vehicular communication networks, such as described herein. The vehicular PHY data unit generator 145 is configured to generate a PPDU for transmission in a composite communication channel by generating at least a portion of a preamble of the PPDU to span a bandwidth of a sub-band of the composite channel and duplicating the at least the portion of the preamble of the PPDU in multiple sub-bands of the composite channel, in an embodiment. The vehicular PHY data unit generator 145 is configured to generate the at least the portion of the PHY preamble based on a first orthogonal frequency division multiplexing (OFDM) numerology down-clocked to span the sub-band of the composite channel. In an embodiment, the first OFDM numerology corresponds to an OFDM numerology used by legacy wireless communication devices operating in the vehicular communication network 110 so that the at least the portion of the preamble is decodable by both i) legacy wireless communication devices operating in the vehicular communication network 110 and ii) non-legacy wireless communication devices operating using a communication channel that spans only a sub-band of the composite communication channel. The vehicular PHY data unit generator 145 is configured to generate a data portion of the PPDU based on a second OFDM numerology down-clocked to span the composite communication channel, in an embodiment.

In an embodiment, the vehicular PHY data unit generator 145 is implemented by a processor configured to execute machine readable instructions stored in a memory device (not shown) such as a RAM, a ROM, a flash memory, etc., in various embodiments. In an embodiment, the vehicular PHY data unit generator 145 additionally or alternatively includes a hardware state machine that is configured to generate PPDUs, for transmission in composite communication channels in vehicular communication networks, such as described herein.

In an embodiment, the network interface 122 includes a vehicular channel access controller 148 that is configured to control access of the AP 114 to composite communication channels in vehicular communication networks. In an embodiment, the PHY processor 130 includes at least a portion of the vehicular channel access controller 148. In an embodiment, the MAC processor 126 includes at least a portion of the vehicular channel access controller 148. In an embodiment, the vehicular channel controller 145 is configured to implement composite channel access procedures such as described herein. In an embodiment, the vehicular channel controller 148 is implemented by a processor configured to execute machine readable instructions stored in a memory device (not shown) such as a RAM, a ROM, a flash memory, etc. In an embodiment, the vehicular channel controller 148 additionally or alternatively includes a hardware state machine that is configured to implement composite channel access procedures such as described herein.

The vehicular communication network 110 includes a plurality of client stations 154. Although three client stations 154 are illustrated in FIG. 1, the vehicular communication network 110 includes other suitable numbers (e.g., 1, 2, 4, 5, 6, etc.) of client stations 154 in various embodiments. The client station 154-1 includes a host processor 158 coupled to a network interface device 162. The network interface device 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. In various embodiments, the MAC processor 126 and the PHY processor 130 are configured to operate according to at least the first communication protocol (e.g., the IEEE 802.11bd Standard) and/or the second communication protocol (e.g., the IEEE 802.11p Standard).

The network interface device 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network interface device 162 may be implemented, at least partially, on a second IC. As another example, the host processor 158 and at least a portion of the network interface device 162 may be implemented on a single IC.

In various embodiments, the MAC processor 166 and the PHY processor 170 of the client station 154-1 are configured to generate data units, and process received data units, that conform to the first communication protocol or another suitable communication protocol. For example, the MAC processor 166 is configured to implement MAC layer functions, including MAC layer functions of the first communication protocol, and the PHY processor 170 is configured to implement PHY functions, including PHY functions of the first communication protocol. For instance, the MAC processor 166 is configured to generate MAC layer data units such as MAC service data units (MSDUs), MPDUs, A-MPDUs, etc., and provide the MAC layer data units to the PHY processor 170.

The PHY processor 170 is configured to receive MAC layer data units from the MAC processor 166 and to encapsulate the MAC layer data units to generate PHY data units such as PHY protocol data units (PPDUs), PHY protocol service data units (PSDUs), etc., for transmission via the antennas 174. Similarly, the PHY processor 170 is configured to receive PHY data units that were received via the antennas 174, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more radio frequency (RF) signals received via the one or more antennas 174 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes one or more forward error correction (FEC) encoders (e.g., a binary convolutional code (BCC) encoder, a low density parity check (LDPC) encoder, etc.), one or more FEC decoders (e.g., a BCC decoder, an LDPC decoder, etc.), amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals, for example by providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the network interface 162 includes a vehicular PHY data unit generator 195 that is configured to generate PPDUs for transmission in composite communication channels in vehicular communication networks, according to an embodiment. In an embodiment, the PHY processor 170 includes the vehicular PHY data unit generator 195. In an embodiment, the vehicular PHY data unit generator 195 is configured to generate PPDUs, for transmission in composite communication channels in vehicular communication networks, such as described herein. The vehicular PHY data unit generator 195 is configured to generate a PPDU for transmission in a composite communication channel by generating at least a portion of a preamble of the PPDU to span a bandwidth of a sub-band of the composite channel and duplicating the at least the portion of the preamble of the PPDU in multiple sub-bands of the composite channel, in an embodiment. The vehicular PHY data unit generator 195 is configured to generate the at least the portion of the PHY preamble based on the first OFDM numerology down-clocked to span the sub-band of the composite channel. In an embodiment, the first OFDM numerology corresponds to the OFDM numerology used by legacy wireless communication devices operating in the vehicular communication network 110 so that the at least the portion of the preamble is decodable by both i) legacy wireless communication devices operating in the vehicular communication network 110 and ii) non-legacy wireless communication devices operating using a communication channel that spans only a sub-band of the composite communication channel. The vehicular PHY data unit generator 195 is also configured to generate a data portion of the PPDU based on the second OFDM numerology down-clocked to span the composite communication channel, in an embodiment.

In an embodiment, the vehicular PHY data unit generator 195 is implemented by a processor configured to execute machine readable instructions stored in a memory device (not shown) such as a RAM, a ROM, a flash memory, etc. In an embodiment, the vehicular PHY data unit generator 195 additionally or alternatively includes a hardware state machine that is configured to generate PPDUs, for transmission in composite communication channels in vehicular communication networks, such as described herein.

In an embodiment, the network interface 162 includes a vehicular channel access controller 198 that is configured to control access of the client station 154-1 to composite communication channels in vehicular communication networks. In an embodiment, the PHY processor 170 includes at least a portion of the vehicular channel access controller 198. In an embodiment, the MAC processor 136 includes at least a portion of the vehicular channel access controller 198. In an embodiment, the vehicular channel controller 198 is configured to implement composite channel access procedures such as described herein. In an embodiment, the vehicular channel controller 198 is implemented by a processor configured to execute machine readable instructions stored in a memory device (not shown) such as a RAM, a ROM, a flash memory, etc. In an embodiment, the vehicular channel controller 198 additionally or alternatively includes a hardware state machine that is configured to implement composite channel access procedures such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

According to an embodiment, the client station 154-4 is a legacy client station, i.e., the client station 154-4 is not enabled to receive and fully decode a data unit that is transmitted by the AP 14 or another client station 154 according to the first communication protocol. Similarly, according to an embodiment, the legacy client station 154-4 is not enabled to transmit data units according to the first communication protocol. On the other hand, the legacy client station 154-4 is enabled to receive and fully decode and transmit data units according to the second communication protocol.

In an embodiment, the vehicular communication network 110 operates using one or more direct short range communication (DSRC) channel defined in the frequency band of 5.9 GHz, in the frequency range between 5.85 GHz and 5.925 GHz. The DSRC channels include seven 10 MHz-wide communication channels, indexed as channel (CH) 172 to channel (CH) 184 in increments of two (i.e., CH 172, CH 174, CH 176, CH 178, CH 180, CH 182 and CH 184). In an embodiment, one of the channels (e.g., CH 178) is designated as control channel, and the remaining channels are used as data channels. In other embodiments, other suitable frequency bands and/or other suitable channelization schemes are utilized.

In some embodiments, client stations 154 and/or the AP 114 operate in the Vehicular communication network 110 in an output of context of a BSS (OCB) mode in which the communication devices operate without establishment of a BSS and/or without association with a BSS. In an embodiment, client stations 154 in the Vehicular communication network 110 communicate with other client stations 154 and/or with the AP 114 without first associating with a BSS operated by the AP 114. In an embodiment, client station 154 in the Vehicular communication network 110 communicate directly with each other. In some embodiments, the Vehicular communication network 110 omits the AP 114.

Figure 2:
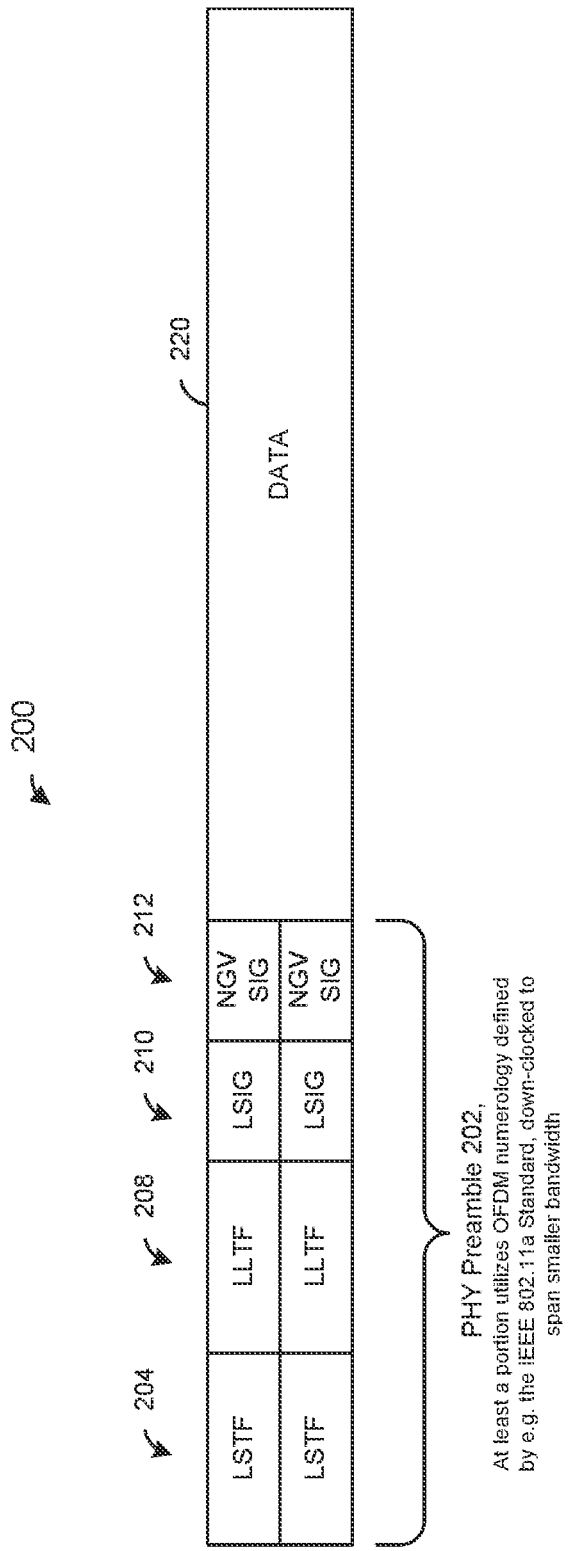
FIG. 2 is a diagram of an example physical layer protocol data unit (PPDU) for transmission in the vehicular communication network of FIG. 1, according to an embodiment.

FIG. 2 is a diagram of an example PPDU 200 for transmission in a vehicular communication network such as the vehicular communication network 110 (FIG. 1), according to an embodiment. The network interface device 122 (FIG. 1) is configured to generate and transmit a PPDU such as the PPDU 200 to one or more client stations 154, according to an embodiment. The network interface device 162 (FIG. 1) is also configured to generate and transmit a PPDU such as the PPDU 200 to the AP 114 or to another client station 154, in an embodiment. In an embodiment, the PHY processor 130/170 is configured to generate a PPDU such as the PPDU 200. In an embodiment, the vehicular PHY data unit generator 145/195 is configured to generate a PPDU such as the PPDU 200.

The PPDU 200 conforms to the first communication protocol (e.g., the IEEE 802.11bd Standard) and spans a 20 MHz bandwidth, according to an embodiment. In other embodiments, PPDUs similar to the PPDU 200 occupy different bandwidths such as 40 MHz, 80 MHz, 160 MHz, or any suitable bandwidth. Additionally, the 20 MHz band need not be contiguous, and includes two or more smaller bands, such as two 10 MHz bands, separated in frequency, in some embodiments. The PPDU is suitable for "mixed mode" situations, i.e., when the vehicular communication network 100 includes a client station (i.e., the legacy client station 154-4) that conforms to a legacy communication protocol (e.g., the IEEE 802.11p Standard), but not the first communication protocol (e.g., the IEEE 802.11bd Standard). The data unit 200 can be utilized in other situations as well.

The PPDU 200 includes a PHY preamble 202 that is duplicated in multiple sub-bands of the PPDU 200. The PPDU 200 also includes a data portion 220 that spans the bandwidth of the PPDU 200. In an embodiment in which the PPDU 200 spans a 20 MHz bandwidth, the PHY preamble 202 is duplicated in each 10 MHz sub-band of the 20 MHz bandwidth. In an embodiment, each duplicate of the PHY preamble 202 includes a legacy short training field (LSTF) 204, generally used for packet detection, initial synchronization, and automatic gain control (AGC) adjustment, and a legacy long training field (LLTF) 208, generally used for channel estimation and fine synchronization. Each duplicate of the PHY preamble 202 also includes a legacy signal field (LSIG) 210 and a non-legacy signal field (NGVSIG) 214. The NGVSIG 212 conforms to the IEEE 802.11bd Standard and is decodable by a communication device that is configured to operate according to the IEEE 802.11bd Standard, in an embodiment. The NGVSIG 212 includes one or more subfields that indicate PHY parameters corresponding to the data portion 220, such a modulation and coding scheme (MCS) field that indicates an MCS with which the data portion 220 is encoded, a dual sub-carrier modulation (DCM) field that indicates whether a dual sub-carrier feature is enabled along with suitable parameters (e.g., carrier spacing), etc., in an embodiment.

In an embodiment, the PHY preamble 202 of the PPDU 200 includes one or more OFDM symbols. In an embodiment, the PHY preamble 202 of the PPDU 200 is generated based on an OFDM numerology defined, by a first wireless communication standard, for a bandwidth that is larger the bandwidth of the PHY preamble 202, and using a down-clocking factor to generate the PHY preamble 202 to span a narrower bandwidth of the PHY preamble 202. For example, the PHY preamble 202 is generated based on an OFDM numerology defined, by the IEEE 802.11a Standard, for a 20 MHz bandwidth, and using a down-clocking factor of two (×2) to generate the PHY preamble 202 to span a 10 MHz bandwidth of the PHY preamble 202. For example, OFDM symbols of the PHY preamble 202 are generated using a same FFT size and, accordingly, a same number of OFDM tones as defined for a 20 MHz bandwidth by the IEEE 802.11a Standard, but using a sampling rate that is reduced (down-clocked) by a factor of two (×2) with respect to the sampling rate specified by the IEEE 802.11a Standard. Accordingly, in an embodiment, OFDM tone spacing in the PHY preamble 202 is reduced by a factor of two (×2) with respect to the OFDM tone spacing defined by the IEEE 802.11a Standard. In an embodiment, the OFDM numerology and the down-clocking factor used for generating the PHY preamble 202 correspond to the OFDM numerology and the down-clocking factor specified for generating a PHY preamble according to the second communication protocol (e.g., the IEEE 802.11p Standard).

In an embodiment, because the PHY preamble 202 is duplicated in multiple sub-bands of the PPDU 200 and is generated based on an OFDM numerology using a down-clocking factor specified for generating a PHY preamble according to the second communication protocol, a legacy or a non-legacy communication device that is operating using a communication channel that corresponds to a sub-band of the PPDU 200 is configured to detect the PPDU 200 based on the PHY preamble 202 in the corresponding sub-band of the PPDU 200. In an embodiment, the legacy or non-legacy communication device is configured to determine a duration corresponding to transmission of the PPDU 200 based on the PHY preamble 202 in the corresponding sub-band of the PPDU 200, and to wait for the determined duration before attempting to transmit in the communication medium, in an embodiment. For example, in an embodiment, LSIG 210 has a format at least substantially as specified in the IEEE 802.11p Standard and includes information that permits a legacy communication device that is configured according to operate the IEEE 802.11p Standard, but not the IEEE 802.11bd Standard, to determine a duration corresponding to transmission of the PPDU 200 and to wait for the determined duration before attempting to transmit in the communication medium. In another embodiment, a non-legacy communication device that is configured to operate according to the IEEE 802.11bd Standard but is operating using a 10 MHz channel that corresponds to a sub-band of the PPDU 200 is configured to determine a duration corresponding to transmission of the PPDU 200 based on the PHY preamble 202 transmitted in the corresponding sub-band of the PPDU 200, and to wait for the determined duration before attempting to transmit in the communication medium.

In some embodiments, different phase rotation is applied to OFDM symbols of the PHY preamble 202 in different sub-bands (e.g., different 10 MHz sub-bands) of the PPDU 200. For example, in one embodiment, a first sub-band is rotated 0-degrees, and a second sub-band is rotated 90-degrees. In other embodiments, different suitable phase rotations are utilized. As just one example, a first sub-band is rotated 45-degrees and a second sub-band is rotated—45-degrees, in an embodiment. Different phase rotations in the different sub-bands reduces peak-to-average ratio (PAR) in the PPDU 200 in at least some embodiments.

In an embodiment, the data portion 220 of the PPDU 200 spans the entire bandwidth of the PPDU 200. The data portion 220 includes one or more OFDM symbols each spanning the entire bandwidth of the PPDU 200. In an embodiment, an OFDM symbol of the data portion has a format defined over the entire bandwidth of the PPDU 200. In another embodiment, an OFDM symbol of the PPDU 200 has a format defined for respective sub-bands of the bandwidth. In one such embodiment, a format defined for a sub-band of the bandwidth is duplicated in each of the sub-bands of the bandwidth.

Figure 3A:
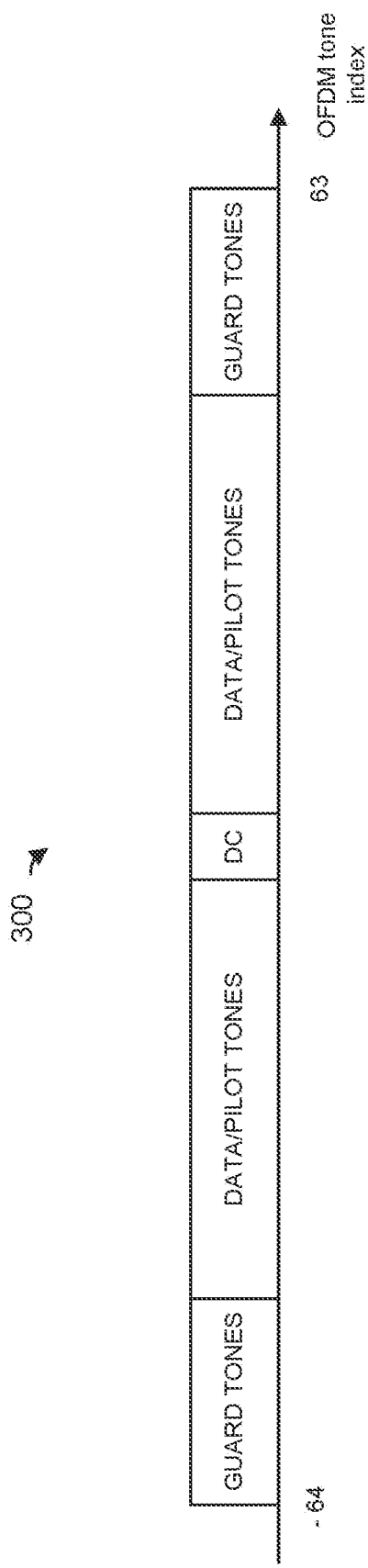
FIG. 3A is a block diagram of an example orthogonal frequency division multiplexing (OFDM) symbol of the PPDU of FIG. 2, according to an embodiment

FIG. 3A is a block diagram of an OFDM symbol 300 included in the data portion 220 of the PPDU 200 (FIG. 2), according to an embodiment. The OFDM symbol 300 has a format that is defined over the entire bandwidth of the PPDU 200. According to an embodiment, the OFDM symbol 300 corresponds to a size 128 IDFT and includes 128 tones. The 128 tones are indexed from −64 to +63, in an embodiment. The 128 tones include zero, or null, tones, including guard tones and direct current (DC) tones, in an embodiment. In an embodiment, the six lowest frequency tones, indexed −64 to −59, and the five highest frequency tones, indexed 59 to 63, are guard tones, which are provided for filter ramp up and ramp down. The three tones indexed from −1 to +1 are DC tones, which are provided for mitigating radio frequency interference, in an embodiment. The OFDM symbol 300 also includes 114 data/pilot tones indexed −58 to −2 and 2 to 58, including six tones indexed −53, −25, −11, 11, 25, and 53 are pilot tones, and data tones which are the remaining tones, in an embodiment. The OFDM symbol 300 is down-clocked by a factor of two (×2) with respect to an OFDM numerology defined for a 40 MHz bandwidth by the IEEE 802.11n Standard, in an embodiment. Accordingly, the OFDM symbol 300 has the same format as specified for a 40 MHz bandwidth in the IEEE 802.11n Standard but with tone spacing reduced by a factor of two (×2), in an embodiment. In an embodiment, whereas an OFDM symbol generated for a 40 MHz bandwidth according to the IEEE 802.11n Standard includes 128 tones with 156.25 kHz spacing between consecutive OFDM tones, the OFDM symbol 300 includes 128 tones with 78.125 kHz spacing between consecutive OFDM tones.

Figure 3B:
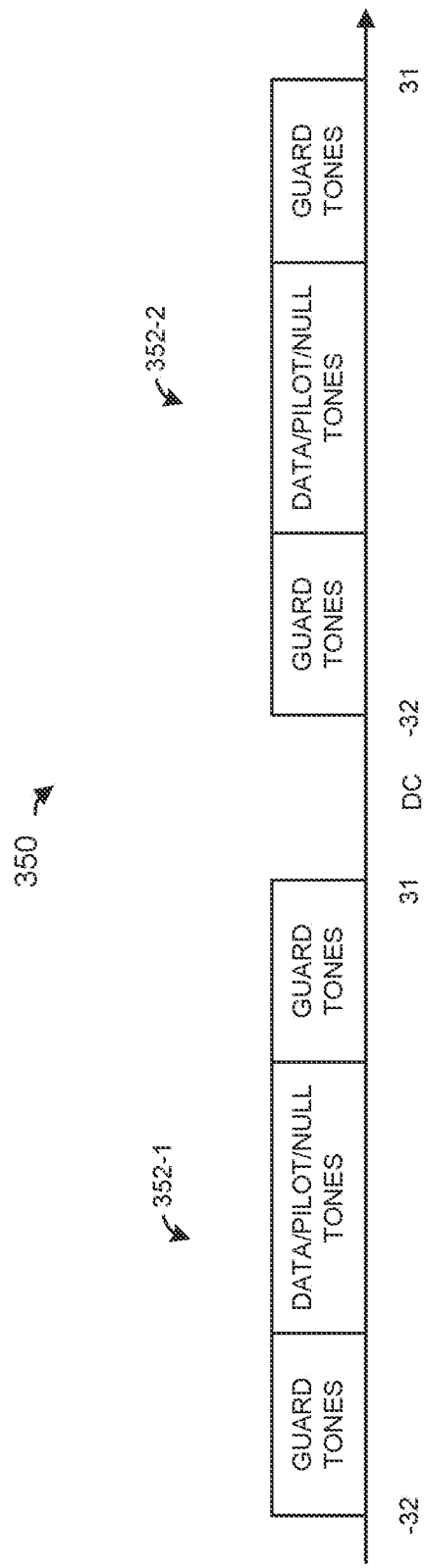
FIG. 3B is a block diagram of an OFDM symbol of the PPDU of FIG. 2, according to another embodiment.

FIG. 3B is a block diagram of an OFDM symbol 350 of the data portion 220 of the PPDU 200, according to another embodiment. The OFDM symbol 350 has a format that is duplicated in respective sub-bands of the PPDU 200. According to an embodiment, the OFDM symbol 350 includes two duplicate portions 352 each corresponding to a size 64 IDFT and each including 64 tones. The 64 tones are indexed from −32 to +31, in an embodiment. The 64 tones include zero, or null, tones, including guard tones and direct current (DC) tones, in an embodiment. In an embodiment, the six lowest frequency tones, indexed −32 to −27, and the five highest frequency tones, indexed 27 to 31, are guard tones, which are provided for filter ramp up and ramp down. The tone indexed 0 is a DC tone, which are provided for mitigating radio frequency interference, in an embodiment. The 64 tones also include 52 data/pilot tones indexed −26 to −1 and 1 to 26, in an embodiment. In an embodiment, of the 52 data/pilot tones, six pilot tones indexed −53, −25, −11, 11, 25, and 53 are pilot tones, and the remaining tones are data tones. The OFDM symbol 350 is down-clocked by a factor of two (×2) with respect to an OFDM numerology defined for a 20 MHz bandwidth by the IEEE 802.11a Standard, in an embodiment. Accordingly, each portion 352 of the OFDM symbol 350 has the same format as specified for a 20 MHz bandwidth in the IEEE 802.11a Standard but with tone spacing reduced by a factor of two (×2), in an embodiment. The OFDM symbol 350 is down-clocked by a factor of two (×2) with respect to an OFDM numerology defined for a 20 MHz bandwidth by the IEEE 802.11n Standard, in another embodiment. Accordingly, each portion 352 of the OFDM symbol 350 has the same format as specified for a 20 MHz bandwidth in the IEEE 802.11n Standard but with tone spacing reduced by a factor of two (×2), in an embodiment. In an embodiment, whereas an OFDM symbol generated for a 20 MHz bandwidth according to the IEEE 802.11a/n Standard includes 64 tones with 156.25 kHz spacing between consecutive OFDM tones, each portion 352 of the OFDM symbol 350 includes 64 tones with 78.125 kHz spacing between consecutive OFDM tones.

In an embodiment, communication devices (e.g., the AP 114 and client stations 154) in the vehicular communication network 110 contend for a wireless communication medium using clear channel assessment (CCA) procedures, such as carrier sense multiple access with collision avoidance (CSMA/CA) procedures or other suitable channel assessment procedures. The CCA procedures include a virtual carrier sensing procedure, in an embodiment. The CCA procedures also include physical carrier sensing and energy detection procedures, in an embodiment. To implement the virtual carrier sensing procedure, the communication devices maintain respective network allocation vectors (NAVs) that include timers for tracking when another communication device has seized control or "ownership" of the wireless communication medium. For example, when a communication device (e.g., the AP 114 or a client station 154) receives a valid signal, such as a transmitted PHY data unit (e.g., the PHY data unit 200 of FIG. 2 or another suitable PHY data unit) that conforms to a particular communication protocol (e.g., the IEEE 802.11p Standard, the IEEE 802.11bd, a future version of the IEEE 802.11 Standard, or another suitable communication protocol), the communication device examines duration information included in a header and/or a preamble of the valid signal data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the wireless communication medium and that the communication device therefore should generally refrain from transmitting in the wireless communication medium. On the other hand, when the value of the NAV timer reaches zero, this indicates that the wireless communication medium is not currently owned by another communication device.

In an embodiment, when the NAV is zero, the communication device implements the physical carrier sensing and energy detection procedures. To implement the physical carrier sensing and energy detection procedure, the communication device senses a signal level and an energy level in the wireless communication medium for a predetermined length of time, such as a length of time corresponding to a distributed coordination function (DCF) interframe space (DIFS) time period or another suitable time period, in an embodiment. Physical carrier sensing involves valid signal detection (e.g., a transmitted PHY data unit such as the PPDU 200) in the wireless communication medium, in an embodiment, and the physical carrier sensing procedure is sometimes referred to herein as a "signal detection" procedure. In an embodiment, if the communication detects a valid signal in the wireless communication medium, the communication device decodes a duration indication in the signal and determines that the medium is busy for the duration indicated in a header and/or a preamble of the signal. In energy detection, the communication device does not detect a valid signal, but if the communication device detects an energy level that is above an energy detection threshold value, the communication device determines that the medium is busy for the duration of time for which the energy remains above the threshold.

In an embodiment, if, during the predetermined length of time, no valid signal is detected in the wireless communication medium and the detected energy in the wireless communication medium remains below an energy detection threshold, then the communication device invokes a backoff procedure in which the communication device continues to perform signal detection and energy detection in the wireless communication medium, to determine whether the wireless communication medium is busy or idle, for an additional deferral time period. In an embodiment, the backoff procedure includes randomly or pseudorandomly choosing an initial value for the backoff timer when the current value of the backoff timer is zero. In an embodiment, the communication device chooses the initial value for the backoff timer from a range of initial values [0, CW], where CW is a contention window parameter, where the initial value and CW are in units of slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of Cwmax, in an embodiment. The parameters CWmin and CWmax are also in units of slots.

In an embodiment, while the communication device determines that the wireless communication medium is idle, the communication device decrements the backoff timer. When the communication device determines that the wireless communication medium is busy, the communication device pauses the backoff timer and does not resume decrementing the backoff timer until the wireless communication medium is subsequently determined to be idle. For example, when the communication device detects a valid signal and decodes a duration field in the valid signal, the communication device pauses the backoff timer for a length of time corresponding to the duration indicated in the duration field of the valid signal, in an embodiment. As another example, when the communication device detects an energy level that is above the energy detection threshold, the communication device pauses the backoff times while the energy level remains above the energy detection threshold level, in an embodiment. When the communication device determines that the wireless communication medium is idle, the communication device resumes counting down the backoff counter. Setting the backoff timer to an initial value chosen randomly or pseudo-randomly (e.g., as described above) ensures that backoff timers of different communication devices in the network tend to reach zero at different times, in at least some embodiments. In an embodiment, when the backoff timer reaches zero, the communication device determines that the communication device is free to transmit.

In an embodiment, a communication device (e.g., the AP 114 or a client station 154) operating in the vehicular communication network 110 utilizes CCA procedures, such as the CCA procedures described above, to contend for transmission in a composite communication channel that includes multiple component channels. In an embodiment, the communication device is configured to transmit a data unit that spans the composite communication channel or a data unit that spans only a component channel of the composite communication channel depending on whether the composite communication channel or only the component channel is available for transmission. In another embodiment, the communication device is configured to transmit a data unit that spans the composite communication channel when all of the component channels are available for transmission, and to refrain from transmission in the composite communication channel when not all of the component channels are available for transmission.

Figure 4:
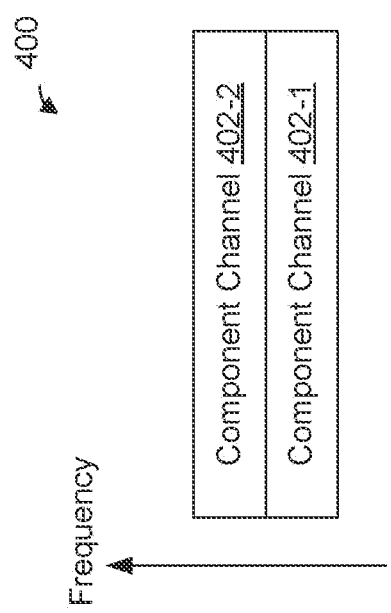
FIG. 4 is a diagram of an example composite communication channel used by a communication device of the vehicular communication network of FIG. 1, according to an embodiment.

FIG. 4 is a diagram of an example composite communication channel 400 that corresponds to an operating channel of a communication device (e.g., the AP 114 or a client station 154) of the vehicular communication network 110 of FIG. 1, according to an embodiment. In other embodiments, the operating channel 400 is utilized by a communication device (e.g., an AP or a client station) in a suitable communication network different from the vehicular communication network 110 of FIG. 1.

The communication channel 400 is a composite communication channel that includes two component channels 402, including a first component channel 402-1 and a second component channel 402-2. In an embodiment, the communication channel 400 spans a 20 MHz bandwidth, and each component channel 402-1, 402-2 spans a 10 MHz bandwidth corresponding the a respective 10 MHz sub-band of the of communication channel 400. The communication channel 400 is illustrated as having two component channels for explanatory purposes. In other embodiments, the communication channel 400 includes other suitable numbers (e.g., 3, 4, 5, 6, etc.) of component channels. In some embodiments, the communication channel 400 spans suitable bandwidths (e.g., 40 MHz, 80 MHz, etc.) other than 20 MHz and/or the component channels 402 span suitable sub-bands (e.g., 2 MHz, 5 MHz, etc.) other than 10 MHz sub-bands.

In an embodiment, the communication channel 400 has a center frequency in the range between 5.85 GHz and 5.925 GHz. For example, the communication channel 400 corresponds to a communication channel that in the licensed is intelligent transportation systems (ITS) frequency band of 5.85-5.925 GHz, in an embodiment. Accordingly, each component channel 402 of the communication channel 400 has a center frequency that is in the range between 5.85 GHz and 5.925 GHz, in an embodiment. In an embodiment, each component channel 402 corresponds to a respective 10-MHz wide DSRC channel in the range between 5.85 GHz and 5.925 GHz. In other embodiments, the communication channel 400 and/or the component channels 402 correspond to other suitable frequency bands and/or other suitable channels widths.

In an embodiment, a communication device (e.g., the AP 114 and client stations 154) that is operating with an operating channel that corresponds to the communication channel 400 impalements channel access procures described herein to gain access to the composite communication channel 400. In an embodiment, the network interface device 122 (FIG. 1) is configured to control access of the AP 114 to a composite communication channel, such as the composite communication channel 400, as described herein. In an embodiment, the network interface device 162 (FIG. 1) is configured to is configured to control access of the client station 154-1 to a composite communication channel, such as the composite communication channel 400, as described herein. In an embodiment, the vehicular channel access controller 148/198 is configured to control access to a composite communication channel, such as the composite communication channel 400, as described herein.

In an embodiment, a communication device (e.g., the AP 114 or a client station 154) that is operating with an operating channel corresponding to the communication channel 400 designates one of the component channels 402 as a primary channel, and treats the other one or more component channels 402 as secondary channels. In an embodiment, the communication device randomly selects one of the component channels 402 to be designated as the primary channel. In other embodiments, the communication device utilizes other suitable selection schemes to select a component channel 402 to be designated as the primary channel. In an embodiment, the communication device designates different ones of the component channels 402 as the primary channel for different ones of multiple transmissions to be performed by the communication device. For example, the communication device selects the component channel 402-1 to be designated as the primary channel for a first transmission (e.g., transmission of a first PPDU such as the PPDU 200) to be performed by the communication device at a first time, and selects the component channel 402-2 to be designated as the primary channel for a second transmission (e.g., transmission of a second PPDU such as the PPDU 200) to be performed by the communication device at a second time, in an embodiment. In some embodiments, selection of a component channel to be designated as the primary channel persists for multiple or all transmissions performed by the communication device. For explanatory purposes, the component channel 402-1 in FIG. 4 is designated as the primary channel (sometimes referred to herein as simply "primary channel" 402-1), and the component channel 402-2 in FIG. 4 is the secondary channel (sometimes referred to herein as simply "primary channel" 402-1), in an embodiment. In another embodiment, the component channel 402-2 in FIG. 4 is designated as the primary channel, and the component channel 402-2 in FIG. 4 is the secondary channel. In some embodiment, as described in more detail below, the communication device operates without designating any component channel 402 as a primary channel.

In an embodiment, the communication device indicates, to one or more other communication devices in the vehicular communication network 110, the component channel 402 that the communication device has designated as the primary channel. For example, the communication device generates a data unit (e.g., the PPDU 200) to include a primary channel indication that indicates the component channel 402 that is designated by the communication device as the primary component channel, in an embodiment. In an embodiment, the primary channel indication includes, example an index and/or a channel number corresponding to the component channel 402 that is designated by the communication device as the primary component channel. In an embodiment, the communication device generates the data unit to include the primary channel indication in a PHY preamble or in a MAC header of the data unit. The communication device transmits the data unit in the communication channel 400 to one or more other communication devices in the vehicular communication network 110, in an embodiment. In another embodiment, the communication device generates a control data unit to include the primary channel indication in a control frame of the control data unit. The communication device transmits the control data unit in a control channel, such as the DSRC control channel (channel 178) specified on the IEEE 802.11p Standard, to announce the primary component channel to other commination devices in the vehicular communication network 110. In other embodiments, the communication device does not provide any indication of the component channel 402 that the communication device has designated as the primary channel.

In an embodiment, in connection with transmission in the communication channel 400, the communication device implements the CCA procedures, as described above, by first sensing the primary channel 402-1. For example, the communication device sets its NAV timer based on a data unit that the communication device detects in the primary channel 402-1. When the NAV timer reaches zero, the communication device performs the signal and energy detection procedures by sensing the primary channel 402-1, and initiates a backoff timer corresponding to the primary channel 402-1. The communication device then continues to sense the primary channel 402-1 while decrementing the backoff timer corresponding to the primary channel 402-1. When the communication device determines, based on the CCA procedures performed in the primary channel 402-1, that the primary channel 402-1 is idle to transmit, the communication device also checks the secondary channel 402-2 to determine whether the secondary channel 402-2 can be utilized for transmission along with the primary channel 402-1. For example, in an embodiment, the communication device performs energy detection in the secondary channel 402-2 for a predetermined length of time N immediately preceding expiration of the backoff timer corresponding to the primary channel 402-1. In an embodiment, the predetermined length of time N corresponds to point coordination function (PCF) interframe space (PIFS) time period. In an embodiment, the PIFS time period is 19 µs. In another embodiment, the PIFS time period is 30 µs. In other embodiments, other suitable time periods are utilized.

In an embodiment, energy detection in the secondary channel 402-2 involves measuring an energy level in the secondary channel 402-2 and comparing the energy level to an energy detection threshold. In an embodiment, the energy detection threshold that the communication device utilizes for energy detection in the secondary channel 402-2 is the same as an energy detection threshold that the communication device utilizes for energy detection in the primary channel 402-1. For example, the energy detection threshold for energy detection in the secondary channel 402-2 is not relaxed with respect to the energy detection threshold for energy detection in the primary channel 402-1, in this embodiment. In an embodiment, the communication device utilizes an energy detection threshold of −65 dBm for energy detection in each of the primary channel 402-1 and the secondary channel 402-2. In other embodiments, the communication device utilizes other suitable energy detection thresholds for energy detection in each of the primary channel 402-1 and the secondary channel 402-2. In yet another embodiment, the communication device utilizes different energy detection thresholds for energy detection in the primary channel 402-1 and the secondary channel 402-2. For example, the communication device uses a relatively lower energy detection threshold for energy detection in the primary channel 402-1 as compared to a relatively higher energy detection threshold that the communication device uses for energy detection in the secondary channel 402-2, in an embodiment. In other words, the energy detection threshold used by the communication device for energy detection in the secondary channel 402-2 is relaxed with respect to the energy detection threshold used by the communication device for energy detection in the primary channel 402-1, in this embodiment.

In an embodiment, in addition to performing energy detection in the secondary channel 402-2 for a predetermined length of time N, the communication device performs signal detection in the secondary channel 402-2 for a predetermined length of time M immediately preceding expiration of the backoff timer corresponding to the primary channel 402-1. In an embodiment, the predetermined length of time M during which the communication device performs signal detection in the secondary channel 402-2 is greater than the predetermined length of time N during which the communication device performs energy detection in the secondary channel 402-2. In an embodiment, the predetermined length of time M is 40 µs. In other embodiments, the predetermined length of time M is a suitable time period different from 40 µs.

In an embodiment, signal detection in the secondary channel 402-2 involves detection of valid signals in the secondary channel 402-2. The communication device detects a valid signal in the secondary channel 402-2 when the communication device senses a signal level that is above a signal detection threshold, in an embodiment. In an embodiment, the signal detection threshold that the communication device utilizes for signal detection in the secondary channel 402-2 is the same as a signal detection threshold that the communication device utilizes for signal detection in the primary channel 402-1. In other words, the signal detection threshold for detecting a valid signal in the secondary channel 402-2 is not relaxed with respect to the signal detection threshold for detecting a valid signal in the primary channel 402-1, in this embodiment. In an embodiment, the communication device utilizes a signal detection threshold of −85 dBm for signal detection in each of the primary channel 402-1 and the secondary channel 402-2. In other embodiments, the communication device utilizes other suitable signal detection thresholds for signal detection in each of the primary channel 402-1 and the secondary channel 402-2. In yet another embodiment, the communication device utilizes different signal detection thresholds for detecting a valid signal in the primary channel 402-1 and the secondary channel 402-2. For example, the communication device uses a relatively lower signal detection threshold for detecting a valid signal in the primary channel 402-1 as compared to a relatively higher signal detection threshold that the communication device uses for detecting a valid signal in the secondary channel 402-2, in an embodiment. In other words, the signal detection threshold used by the communication device for detecting a valid signal in the secondary channel 402-2 is relaxed with respect to the signal detection threshold used by the communication device for detecting a valid signal in the primary channel 402-1, in this embodiment.

In an embodiment, if both i) the detected energy level in the secondary channel 402-2 is below the energy detection threshold used by the communication device for energy detection in the secondary channel 402-2 and ii) no valid signal is detected in the secondary channel 402-2 based on the signal detection threshold used by the communication device for detecting a valid signal in the secondary channel 402-2, the communication device determines that the secondary channel is also idle. When the communication device determines that the secondary channel secondary channel 402-2 is idle, the communication device transmits a data unit that spans both the primary channel 402-1 and the secondary channel 402-2, in an embodiment. On the other hand, if one or more of i) the detected energy level in the secondary channel 402-2 is not below the energy detection threshold used by the communication device for energy detection in the secondary channel 402-2 and ii) a valid signal is detected in the secondary channel 402-2 based on the signal detection threshold used by the communication device for detecting a valid signal in the secondary channel 402-2, the communication device determines that the secondary channel 402-2 is busy, in an embodiment.

In another embodiment, the communication device does not perform signal detection in the secondary channels. For example, the communication device only performs energy detection in the secondary channel 402-2 for a predetermined length of time, such as a PIFS time period, immediately preceding expiration of the backoff timer corresponding to the primary channel, in an embodiment. In this embodiment, the communication device determines that the secondary channel 402-2 is also idle if the detected energy level corresponding to the secondary channel is below the energy detection threshold defined for the secondary channel.

In yet another embodiment, when the communication device invokes a backoff procedure in the primary channel 402-1, the communication device begins to also sense the secondary channel 402-2 at least to perform signal detection in the secondary channel 402-2. If the communication device detects a valid signal in the secondary channel 402-2, and correctly decodes a duration field in the valid signal, the communication device, the communication device pauses the backoff timer corresponding to the primary channel 402-1 for a length of time corresponding to the duration indicated in the duration field of the valid signal detected in the secondary channel 402-2, in an embodiment.

In another embodiment, the communication device implements the virtual carrier sense procedure on both the primary channel 402-1 and the secondary channel 402-2. To implement the virtual carrier sensing procedure in both the primary channel 402-1 and the secondary channel 402-2, the communication device maintains respective NAV timers corresponding to the primary channel 402-1 and the secondary channel 402-2. When the communication device receives a valid signal in the primary channel 402-1 and correctly decodes duration information in a PHY header and/or a MAC header in the valid signal received in the primary channel 402-1, the communication device sets a first NAV timer corresponding to the primary channel 402-1 based on the duration information in the PHY header and/or the MAC header in the valid signal received in the primary channel 402-1, according an embodiment. The communication device then begins to decrement the first NAV timer, in an embodiment. When the communication device receives a valid signal the secondary channel 402-2, and the communication device correctly decodes duration information in a PHY header and/or a MAC header in the valid signal that indicates a duration during which the communication channel will be busy in the secondary channel 402-2, the communication device sets a second NAV timer based on the duration information in the PHY header and/or the MAC header in the valid signal received in the secondary channel 402-2, according an embodiment. The communication device then begins to decrement the second NAV timer, in an embodiment.

In an embodiment, when the first NAV timer corresponding to the primary channel 402-1 reaches zero, the communication device initiates a backoff timer corresponding to the primary channel 402-1, and performs the backoff procedure in the primary channel 402-1. When the communication device determines that the primary channel 402-1 is idle to transmit, the communication device checks whether the secondary channel 402-2 can be used for transmission along with the primary channel 402-1. Checking whether the secondary channel 402-2 can be used for transmission along with the primary channel 402-1 includes checking the current whether the second NAV timer corresponding to the secondary channel 402-2 is zero. If the current value of the second NAV timer corresponding to the secondary channel 402-2 is greater than zero, then the communication device determines that the secondary channel 402-2 is not available for transmission, in an embodiment. On the other hand, if the current value of the second NAV timer corresponding to the secondary channel 402-2 is zero, then the communication device performs signal detection and/or energy detection as described above in the secondary channel 402-1 to determine whether the secondary channel 402-2 is available for transmission, in an embodiment.

In various embodiments, when the communication device determines that the secondary channel 402-2 is available for transmission by the communication device along with the primary channel 402-1, then the communication device transmits a transmission that spans the entire communication channel 400, including the primary channel 402-1 and the secondary channel 402-2 of the communication channel 400. For example, the communication device transmits a PPDU, such as the PPDU 200 of FIG. 2, that spans the primary channel 402-1 and the secondary channel 402-2 of the communication channel 400. On the other hand, when the communication device determines that the secondary channel 402-2 is not available for transmission by the communication device along with the primary channel 402-1, then the communication device transmits a transmission (e.g., a PPDU similar to the PPDU 200 of FIG. 2) that spans only the primary channel 402-1, in an embodiment. In another embodiment, when the communication device determines that the secondary channel 402-2 is not available for transmission by the communication device along with the primary channel 402-1, then the communication device does not perform a transmission. Rather, the communication device initiates the CCA procedure to again attempt to gain access to the communication medium, in an embodiment.

With continued reference to FIG. 4, in some embodiments, a communication device (e.g., the AP 114 or a client station 154) operating with an operating channel that corresponds to the communication channel 400 does not designate any component channel 402 as a primary channel. In this embodiment, the communication device implements the CCA procedures in the communication channel 400 without any component channel 402 being designated as a primary channel. For example, in an embodiment, the communication device senses both the component channel 402-1 and the component channel 402-2 to detect a valid signal in either the component channel 402-1 and the component channel 402-2. In an embodiment, the communication device sets a NAV timer based on correctly decoded duration information in a PHY header and/or a MAC header in the valid signal received in either the component channel 402-1 or the component channel 402-2, and begins to decrement the NAV timer. When the NAV timer reaches zero, the communication performs signal detection and energy detection in both the primary channel 402-1 and the secondary channel 402-2, and initiates a backoff timer if the communication device does not detect a valid signal level that is above a signal detection threshold and/or an energy level that is above an energy detection threshold. The communication device then continues to sense both the primary channel 402-1 and the secondary channel 402-2 while counting down the backoff timer, in an embodiment.

In an embodiment, if, during counting down the backoff timer, the communication device detects a valid signal level that is above a signal detection threshold and/or an energy level that is above an energy detection threshold in either the component channel 402-1 or the component channel 402-2, the communication device determines that the communication medium is busy and freezes the backoff timer until the communication device determines that the communication medium is idle, in an embodiment. When the backoff timer reaches zero, the communication device determines that both the component channel 402-1 and the component channel 402-2 are idle, in an embodiment. The communication device then transmits a transmission that spans the entire communication channel 400, including the component channel 402-1 and the component channel 402-2 of the communication channel 400. For example, the communication device transmits a PPDU, such as the PPDU 200 of FIG. 2, that spans the component channel 402-1 and the component channel 402-2 of the communication channel 400, in an embodiment.

In another embodiment in which the communication device the communication device implements the CCA procedures in the communication channel 400 without any component channel 402 being designated as a primary channel, the communication device maintains respective NAV timers corresponding to the component channel 402-1 and the component channel 402-2. When the communication device receives a valid signal in the component channel 402-1 and correctly decodes duration information in a PHY header and/or a MAC header in the valid signal received in the component channel 402-1, the communication device sets a first NAV timer corresponding to the component channel 402-1 based on the duration information in the PHY header and/or the MAC header in the valid signal received in the component channel 402-1, according an embodiment. The communication device then begins to decrement the first NAV timer, in an embodiment. When the communication device receives a valid signal the component channel 402-2, and the communication device correctly decodes duration information in a PHY header and/or a MAC header in the valid signal that indicates a duration during which the communication channel will be busy in the component channel 402-2, the communication device sets a second NAV timer based on the duration information in the PHY header and/or the MAC header in the valid signal received in the component channel 402-2, according an embodiment. The communication device then begins to decrement the second NAV timer, in an embodiment.

In an embodiment, when the first NAV timer corresponding to the component channel 402-1 reaches zero, the communication device initiates a first backoff timer corresponding the component channel 402-1 and performs the backoff procedure in the component channel 402-1, in an embodiment. When the second NAV timer corresponding to the component channel 402-1 reaches zero, the communication device initiates a second backoff timer corresponding the component channel 402-2 and performs the backoff procedure in the component channel 402-2, in an embodiment. In an embodiment, when one of the first backoff timer corresponding to the component channel 402-1 and the second backoff timer corresponding to the component channel 402-2 reaches zero, the communication device determines that the one of the component channel 402-1 and the component channel 402-2 is idle, in an embodiment. The communication device then checks whether the other one of the component channels 402-1, 402-2 is idle. If the other one of the component channels 402-1, 402-2 is also idle, the communication performs a transmission that spans the entire channel 400, including the first component channel 402-1 and the second component channel 402-2, in an embodiment.

Figure 5:
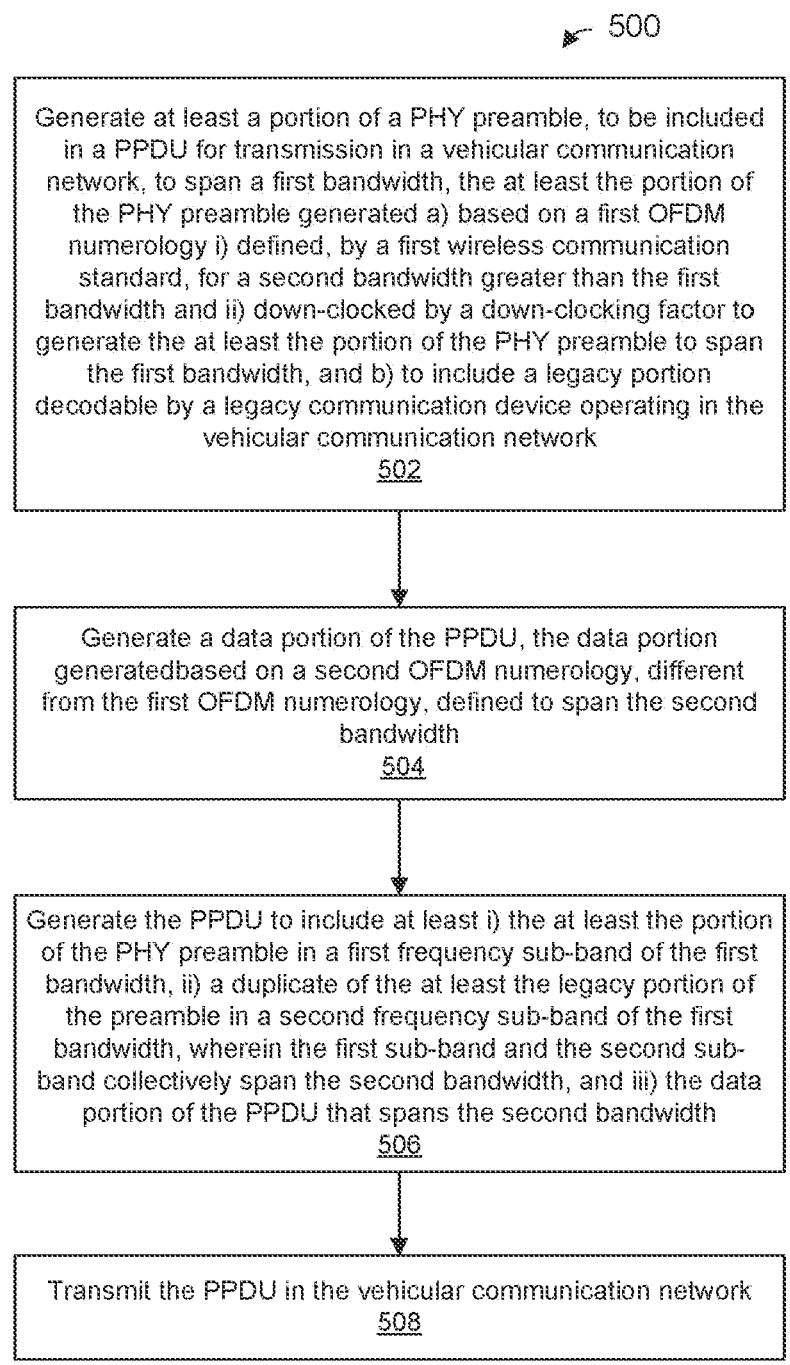
FIG. 5 is a flow diagram of an example method for wireless communication in the vehicular communication network of FIG. 1, according to an embodiment.

FIG. 5 is a flow diagram of an example method 500 for wireless communication in a vehicular communication network, according to an embodiment. With reference to FIG. 1, the method 500 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 500. In an embodiment, the vehicular PHY data unit generator 145 or the vehicular PHY data unit generator 195 is configured to implement at least a portion of the method 500. According to another embodiment, a MAC processor such as the MAC processor 126 or the MAC processor 166 is also configured to implement a portion of the method 500.

At block 502, at least a portion of a physical layer (PHY) preamble, to be included in a PHY protocol data unit (PPDU) for transmission in the vehicular communication network, is generated. The at least the portion of the PHY preamble is generated to span a first bandwidth, in an embodiment. In an embodiment, the at least the portion of the PHY preamble is generated a) based on a first OFDM numerology i) defined, by a first wireless communication standard, for a second bandwidth greater than the first bandwidth and ii) using a down-clocking factor to generate the at least the portion of the PHY preamble to span the first bandwidth. In an embodiment, the at least the portion of the PHY preamble is generated to include a legacy portion decodable by a legacy communication device operating in the vehicular communication network. In an embodiment, legacy communication devices operating in the vehicular communication network are enables to decode a PHY preamble that is generated based on the first OFDM numerology and down-clocked by the down-clocking factor used at block 502 to generate the at least the portion of the PHY preamble. In an embodiment, the at least the portion of the preamble of the PPDU generated at block 502 enables a legacy communication device operating in the vehicular communication network to receive and correctly decode the at least the portion of the PHY preamble, for example to determine duration corresponding to transmission of the PPDU based on the at least the portion of the PHY preamble generated at block 502. The legacy communication device then refrains from attempting to transmit in the communication medium for the determined duration, in an embodiment.

At block 504, a data portion of the PPDU is generated. In an embodiment, the data portion is generated based on a second OFDM numerology, different from the first OFDM numerology, defined to span the second bandwidth. The second OFDM numerology allows for transmission of more data bits per OFDM symbol as compared to the first OFDM numerology. For example, the second OFDM numerology corresponds to a larger size FFT and, accordingly, a greater number of OFMD tones as compared to the first OFDM numerology, in an embodiment.

At block 506, the PPDU is generated to include at least i) the at least the portion of the PHY preamble in a first frequency sub-band of the first bandwidth, ii) a duplicate of the at least the legacy portion of the preamble in a second frequency sub-band of the first bandwidth, wherein the first sub-band and the second sub-band collectively span the second bandwidth, and iii) the data portion of the PPDU that spans the second bandwidth. At block 508 the PPDU is transmitted in the vehicular communication network.

In an embodiment, the PPDU generated at block 506 is transmitted in a composite communication channel, such as the composite communication channel 400, in which a first component channel spans the first frequency sub-band of the PPDU and a second component channel spans the second frequency sub-band of the PPDU. Because the at least the portion of the PHY preamble is duplicated in the first frequency sub-band and the second frequency sub-band of the PPDU, communication devices, including legacy communication device and non-legacy communication devices that are operating in communication channels corresponding to respective ones of the first component channel of the communication channel and the second component channel of the communication channel are able to detect the PPDU, and to refrain from transmission for the duration of the PPDU, in an embodiment.

FIG. 6 is a flow diagram of an example method 600 for accessing a composite communication channel in a vehicular communication network, according to an embodiment. With reference to FIG. 1, the method 600 is implemented by a network interface device such as the network interface device 122 or the network interface device 162, in various embodiments. For example, in one such embodiment, a PHY processor such as the PHY processor 130 or the PHY processor 170 is configured to implement at least a portion of the method 600. According to another embodiment, a MAC processor such as the MAC processor 126 or the MAC processor 166 is also configured to implement a portion of the method 600. In an embodiment, the vehicular channel access controller 148 or the vehicular channel access controller 198 is configured to implement at least a portion of the method 600.

At block 602, a first sub-channel of a composite communication channel is designated as a primary channel by a communication device operating outside the context of a basic service set (OCB) in the vehicular communication network. In an embodiment, a component channel 402 of the composite communication channel 400 is designated as a primary channel at block 602. In another embodiment, a component channel of a composite communication channel different from the composite communication channel 400 is designated as a primary channel at block 602. Designating a first sub-channel of the composite communication channel as a primary channel at block 602 allows the communication device to first perform clear channel access procedures to first determine that the first sub-channel designated as the primary channel is idle, and to then check one of more other sub-channels of the composite communication channel to determine whether the other one of more other sub-channels of the composite communication channel can be used for transmission along with the first sub-channel, even when the communication device operates outside the context of a basic service set (OCB) in the vehicular communication network, in an embodiment.

At block 604, the first sub-channel, designated as the primary channel by the communication device at block 602, is sensed by the communication device to determine when the first sub-channel of the communication channel is available for transmission by the communication device. In an embodiment, sensing the first sub-channel includes performing virtual carrier sensing procedures in the first sub-channel, including setting a NAV timer corresponding to the first sub-channel based on correctly decoded duration information in a valid signal detected in the first sub-channel, and decrementing the NAV timer. Sensing the first sub-channel also includes performing physical carrier sensing procedures and energy sensing procedures in the first sub-channel, in an embodiment. In an embodiment, sensing the first sub-channel includes setting a backoff timer corresponding to the first sub-channel, and continuing performing physical carrier sensing procedures and energy sensing procedures in the first sub-channel while counting down the backoff timer corresponding to the first sub-channel.

At block 606, a second sub-channel of the composite communication channel is sensed by the communication device to determine whether the second sub-channel can be used for transmission by the communication device along with the first sub-channel. Sensing the second sub-channel includes performing physical carrier sensing procedures, energy detection procedures and backoff procedures in the second sub-channel, in an embodiment. In an embodiment, sensing the second sub-channel at block 606 is performed separately from sensing the first sub-channel at block 604. In an embodiment, sensing the second sub-channel at block 606 is performed when the first sub-channel is determined to be idle, for example for a predetermined length of time immediately preceding expiration of the backoff timer corresponding to the first sub-channel, in an embodiment. In an embodiment, a signal detection threshold and an energy detection threshold that are used at block 606 to perform signal detection and energy detection in the second sub-channel are not relaxed with respect to (e.g., are the same as) signal detection threshold and energy detection threshold, respectively, that are used at block 604 to perform signal detection and energy detection in the first sub-channel. Using non-relaxed thresholds for signal and energy detection in the second sub-channels enhances fairness with communication devices operating in the vehicular communication network using a communication channel that corresponds to the second sub-channel of the composite communication channel and/or communication devices that designate a sub-channel corresponding to the second sub-channel of the composite communication channel as their primary channel, in at least some embodiments.

At block 608, in response to determining that i) the first sub-channel is available for transmission by the communication device and ii) the second sub-channel can be used for transmission by the communication device along with the first sub-channel, a data unit that collectively spans the first sub-channel of the communication channel and the second sub-channel of the communication channel is transmitted by the communication device.

In an embodiment, a method for wireless communication in a vehicular communication network includes: generating, by a communication device, at least a portion of a physical layer (PHY) preamble, to be included in a PHY protocol data unit (PPDU) for transmission in the vehicular communication network, to span a first bandwidth, including generating the at least the portion of the PHY preamble a) based on a first orthogonal frequency division multiplexing (OFDM) numerology i) defined, by a first wireless communication standard, for a second bandwidth greater than the first bandwidth and ii) down-clocked by a down-clocking factor to generate the at least the portion of the PHY preamble to span the first bandwidth, and b) to include a legacy portion decodable by a legacy communication device operating in the vehicular communication network; generating, by the communication device, a data portion of the PPDU, including generating the data portion based on a second OFDM numerology, different from the first OFDM numerology, defined to span the second bandwidth; generating, by the communication device, the PPDU to include at least i) the at least the portion of the PHY preamble in a first frequency sub-band of the first bandwidth, ii) a duplicate of the at least the legacy portion of the preamble in a second frequency sub-band of the first bandwidth, wherein the first sub-band and the second sub-band collectively span the second bandwidth, and iii) the data portion of the PPDU that spans the second bandwidth; and transmitting, by the communication device, the PPDU in the vehicular communication network.

In other embodiments, the method also includes one of, or any suitable combination of two or more of, the following features.

Generating the at least the portion of the preamble to span the first bandwidth comprises generating the at least the portion of the preamble to span a 10 MHz bandwidth.

Generating the at least the portion of the PHY preamble based on the first OFDM numerology includes generating the at least the portion of the PHY preamble i) based on an OFDM numerology defined by the IEEE 802.11a Standard for a 20 MHz bandwidth and ii) using a down-clocking factor of two to generate the at least the portion of the PHY preamble to span the 10 MHz bandwidth.

Generating the at least the portion of the PHY preamble based on the first OFDM numerology includes generating the at least the portion of the PHY preamble i) based on an OFDM numerology that corresponds to a 156.25 KHz OFDM tone spacing and ii) using the down-clocking factor of two to generate the at least the portion of the PHY preamble to have a 78.125 kHz OFDM tone spacing.

Generating the at least the portion of the PHY preamble comprises generating the at least the portion of the preamble to further include a non-legacy portion decodable by a non-legacy communication device operating, in the vehicular communication network, using an operating channel that spans only the first bandwidth smaller than the second bandwidth.

Generating the at least the portion of the PHY preamble to include the non-legacy portion comprises generating the at least the portion of the PHY preamble to include a non-legacy signal field decodable by the non-legacy communication device operating, in the vehicular communication network, using the operating channel that spans only the first bandwidth smaller than the second bandwidth.

Generating the PPDU to include at least i) the at least the portion of the PHY preamble in the first frequency sub-band of the first bandwidth, ii) the duplicate of the at least the legacy portion of the preamble in the second frequency sub-band of the first bandwidth includes applying phase rotation to one or both of i) the at least the portion of the PHY preamble in the first frequency sub-band of the first bandwidth and ii) the duplicate of the at least the legacy portion of the preamble in the second frequency sub-band of the first bandwidth.

Generating the data portion of the PPDU comprises generating the data portion of the PPDU using a tone plan that is defined over the second bandwidth.

Transmitting the PPDU in the vehicular communication network comprises transmitting the PPDU in a communication channel having a center frequency between 5.8555 GHz and 5.925 GHz.

The method further comprises, prior to transmitting the PPDU, performing a clear channel assessment to determine that the communication channel is idle, including i) sensing a communication medium in a first sub-channel of the communication channel, the first sub-channel corresponding to a primary channel designated by the communication device and ii) after sensing the communication medium in the first sub-channel, sensing a communication medium in a second sub-channel to determine whether the second sub-channel can be used for transmission along with the first sub-channel.

In another embodiment, a communication device configured to operate in a vehicular communication network comprises a wireless network interface device having one or more integrated circuit (IC) devices configured to: generate at least a portion of a physical layer (PHY) preamble, to be included in a PHY protocol data unit (PPDU) for transmission in a vehicular communication network, to span a first bandwidth, the one or more IC devices being configured to generate the at least the portion of the PHY preamble a) based on a first orthogonal frequency division multiplexing (OFDM) numerology i) defined, by a first wireless communication standard, for a second bandwidth greater than the first bandwidth and ii) down-clocked by a down-clocking factor to generate the at least the portion of the PHY preamble to span the first bandwidth, and b) to include a legacy portion decodable by a legacy communication device operating in the vehicular communication network; generate a data portion of the PPDU, one or more IC devices being configured to generate the data portion based on a second OFDM numerology, different from the first OFDM numerology, defined to span the second bandwidth; generate the PPDU to include at least i) the at least the portion of the PHY preamble in a first frequency sub-band of the first bandwidth, ii) a duplicate of the at least the legacy portion of the preamble in a second frequency sub-band of the first bandwidth, wherein the first sub-band and the second sub-band collectively span the second bandwidth, and iii) the data portion of the PPDU that spans the second bandwidth; and transmit the PPDU in the vehicular communication network.

In other embodiments, the communication device also comprises one of, or any suitable combination of two or more of, the following features.

The one or more IC devices are configured to generate the at least the portion of the preamble to span a 10 MHz bandwidth.

The one or more IC devices are configured to generate the at least the portion of the PHY preamble i) based on an OFDM numerology defined by the IEEE 802.11a Standard for a 20 MHz bandwidth and ii) using a down-clocking factor of two to generate the at least the portion of the PHY preamble to span the 10 MHz bandwidth.

The one or more IC devices are configured to generate the at least the portion of the PHY preamble i) based on an OFDM numerology that corresponds to a 156.25 KHz OFDM tone spacing and ii) using the down-clocking factor of two to generate the at least the portion of the PHY preamble to have a 78.125 kHz OFDM tone spacing.

The one or more IC devices are configured to generate the at least the portion of the preamble to further include a non-legacy portion decodable by a non-legacy communication device operating, in the vehicular communication network, using an operating channel that spans only the first bandwidth smaller than the second bandwidth.

The one or more IC devices are configured to generate the at least the portion of the PHY preamble to include a non-legacy signal field decodable by the non-legacy communication device operating, in the vehicular communication network, using the operating channel that spans only the first bandwidth smaller than the second bandwidth.

The one or more IC devices are further configured to apply phase rotation to one or both of i) the at least the portion of the PHY preamble in the first frequency sub-band of the first bandwidth and ii) the duplicate of the at least the legacy portion of the preamble in the second frequency sub-band of the first bandwidth.

The one or more IC devices are configured to generate the data portion of the PPDU using a tone plan that is defined over the second bandwidth.

The one or more IC devices are configured to transmit the PPDU in a communication channel having a center frequency between 5.8555 GHz and 5.925 GHz.

The communication device is configured to operate outside the context of a basic service set (OCB) in the vehicular communication network.

The one or more IC devices are further configured to, prior to transmitting the PPDU, perform a clear channel assessment to determine that the communication channel is idle, the one or more IC devices being configured to i) sense a communication medium in a first sub-channel of the communication channel, the first sub-channel designated, by the apparatus, as a primary channel of the communication channel and ii) after sensing the communication medium in the first sub-channel, sense a communication medium in a second sub-channel of the communication channel to determine whether the second sub-channel can be used for transmission along with the first sub-channel.

In yet another embodiment, a method for accessing a communication channel in a vehicular communication network includes: designating, by a communication device operating outside the context of a basic service set (OCB) in the vehicular communication network, a first sub-channel of the communication channel as a primary channel; sensing, by the communication device, the first sub-channel, designated as the primary channel by the communication device, to determine when the first sub-channel of the communication channel is available for transmission by the communication device; separately from sensing the first sub-channel, sensing, by the communication device, a second sub-channel of the communication channel to determine whether the second sub-channel can be used for transmission by the communication device along with the first sub-channel; and in response to determining that i) the first sub-channel is available for transmission by the communication device and ii) the second sub-channel can be used for transmission by the communication device along with the first sub-channel, transmitting, by the communication device, a data unit that collectively spans the first sub-channel of the communication channel and the second sub-channel of the communication channel.

In other embodiments, the method also includes one of, or any suitable combination of two or more of, the following features.

Sensing the first sub-channel includes detecting, based on a signal detection threshold value, whether a valid signal is present in the first sub-channel.

Sensing the second sub-channel includes detecting, based on the signal detection threshold value, whether a valid signal is present in the second sub-channel.

Sensing the first sub-channel includes determining whether energy detected by the communication device in the first sub-band is below an energy detection threshold value.

Sensing the second sub-channel includes determining whether energy detected by the communication device in the second sub-band is below the energy detection threshold value.

Sensing the first sub-channel includes i) setting a backoff timer corresponding to the first sub-channel, and ii) decrementing the backoff timer corresponding to the first sub-channel while continuing to sense the first sub-channel, including, when the first sub-channel is determined to be busy, freezing the backoff timer until the first sub-band is determined to be idle.

Sensing the second sub-channel includes, when the second sub-channel is determined to be busy, freezing the backoff timer corresponding to the first sub-channel until the second sub-band is determined to be idle.

In still another embodiment, an apparatus associated with a communication device configured to operate outside the context of a basic service set (OCB) in a vehicular communication network comprises a network interface device having one or more integrated circuit (IC) devices configured to: designate a first sub-channel of the communication channel as a primary channel; sense the first sub-channel, designated as the primary channel by the communication device, to determine when the first sub-channel of the communication channel is available for transmission by the communication device; separately from sensing the first sub-channel, sense a second sub-channel of the communication channel to determine whether the second sub-channel can be used for transmission by the communication device along with the first sub-channel; and in response to determining that i) the first sub-channel is available for transmission by the communication device and ii) the second sub-channel can be used for transmission by the communication device along with the first sub-channel, transmit a data unit that collectively spans the first sub-channel of the communication channel and the second sub-channel of the communication channel.

In other embodiments, the apparatus also comprises one of, or any suitable combination of two or more of, the following features.

The one or more IC devices are configured to sense the first sub-channel at least by detecting, based on a signal detection threshold value, whether a valid signal is present in the first sub-channel.

The one or more IC devices are configured to sense the second sub-channel at least by detecting, based on the signal detection threshold value, whether a valid signal is present in the second sub-channel.

The one or more IC devices are configured to sense the first sub-channel at least by determining whether energy detected by the communication device in the first sub-band is below an energy detection threshold value.

The one or more IC devices are configured to sense the second sub-channel at least by determining whether energy detected by the communication device in the second sub-band is below the energy detection threshold value.

The one or more IC devices are configured to sense the first sub-channel at least by i) setting a backoff timer corresponding to the first sub-channel, and ii) decrementing the backoff timer corresponding to the first sub-channel while continuing to sense the first sub-channel, including, when the first sub-channel is determined to be busy, freezing the backoff timer until the first sub-band is determined to be idle.

The one or more IC devices are configured to sense the second sub-channel at least by, when the second sub-channel is determined to be busy, freezing the backoff timer corresponding to the first sub-channel until the second sub-band is determined to be idle.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by the processor, cause the processor to perform various acts.

When implemented in hardware, the hardware may comprise one or more of discrete components, one or more integrated circuits (ICs), an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for wireless communication in a vehicular communication network, the method comprising:
generating, by a communication device, a physical layer (PHY) preamble to be included in a PHY protocol data unit (PPDU) for transmission in a communication channel in the vehicular communication network, including generating the PHY preamble to include a legacy portion decodable by a legacy communication device operating in the vehicular communication network;
generating, by the communication device, a data portion of the PPDU;
performing, by the communication device, a backoff procedure for a duration of time to determine whether a first sub-channel of the communication channel and a second sub-channel of the communication channel are available for transmission by the communication device, wherein the first sub-channel is designated as a primary channel and the second sub-channel is designated as a secondary channel, including, for the duration of time of the backoff procedure:
sensing the first sub-channel of the communication channel, designated as the primary channel, to determine when the first sub-channel is available for transmission by the communication device, the sensing including determining whether energy detected by the communication device in the first sub-channel is below a first value of an energy detection threshold,
sensing the second sub-channel, designated as the secondary channel, to determine when the second sub-channel is available for transmission by the communication device along with the first sub-channel, the sensing including determining whether energy detected by the communication device in the second sub-channel is below a second value of the energy detection threshold, wherein the second value of the energy detection threshold used for sensing the secondary channel is the same as the first value of the energy detection threshold used for sensing the primary channel,
counting down a backoff counter while performing the sensing of the first sub-channel and the sensing of the second sub-channel,
pausing the counting down of the backoff counter in response to determining, based on the sensing of the first sub-channel, that the first sub-channel is not available for transmission,
pausing the counting down of the backoff counter in response to determining, based on the sensing of the second sub-channel, that the second sub-channel is not available for transmission, and
resuming the counting down of the backoff counter when both i) determining, based on the sensing of the first sub-channel, that the first sub-channel is available for transmission, and ii) determining, based on the sensing of the second sub-channel, that the second sub-channel is available for transmission; and
in response to determining that i) the first sub-channel is available for transmission by the communication device and ii) the second sub-channel can be used for transmission by the communication device along with the first sub-channel, transmitting, by the communication device, the PPDU using the first sub-channel and the second sub-channel in the vehicular communication network in connection with the backoff counter reaching zero.

2. The method of claim 1, wherein generating the PHY preamble includes generating the PHY preamble i) based on an OFDM numerology that corresponds to a 156.25 kHz OFDM tone spacing and ii) using a down-clocking factor of two to generate at least a portion of the PHY preamble to have a 78.125 kHz OFDM tone spacing.

3. The method of claim 1, wherein:
the communication channel spans a first frequency bandwidth; and
generating the PHY preamble comprises generating the PHY the preamble to further include a non-legacy portion decodable by a non-legacy communication device operating, in the vehicular communication network, using an operating channel that spans only a second frequency bandwidth smaller than the first frequency bandwidth.

4. The method of claim 3, wherein generating the PHY preamble to include the non-legacy portion comprises generating the PHY preamble to include a non-legacy signal field decodable by the non-legacy communication device operating, in the vehicular communication network, using the operating channel that spans only the second frequency bandwidth smaller than the first frequency bandwidth.

5. The method of claim 1, wherein transmitting the PPDU in the vehicular communication network comprises transmitting the PPDU in a communication channel having a center frequency between 5.8555 GHz and 5.925 GHz.

6. The method of claim 1, wherein sensing the second sub-channel of the communication channel comprises sensing the second sub-channel after sensing the first sub-channel of the communication channel.

7. The method of claim 1, further comprising:
setting, by the communication device, a network allocation vector (NAV) timer in response to correctly decoding a valid signal received in either of i) the first sub-channel of the communication channel or ii) the second sub-channel of the communication channel; and
initiating, by the communication device, the backoff counter in connection with an expiration of the NAV timer.

8. A communication device configured to operate in a vehicular communication network, the communication device comprising:
a wireless network interface device having one or more integrated circuit (IC) devices configured to:
generate a physical layer (PHY) preamble to be included in a PHY protocol data unit (PPDU) for transmission in a communication channel in the vehicular communication network, including generating the PHY preamble to include a legacy portion decodable by a legacy communication device operating in the vehicular communication network,
generate a data portion of the PPDU,
perform a backoff procedure for a duration of time to determine whether a first sub-channel of the communication channel and a second sub-channel of the communication channel are available for transmission by the communication device, wherein the first sub-channel is designated as a primary channel and the second sub-channel is designated as a secondary channel, including, for the duration of time of the backoff procedure:
sensing the first sub-channel of the communication channel, designated as the primary channel, to determine when the first sub-channel is available for transmission by the communication device, the sensing including determining whether energy detected by the communication device in the first sub-channel is below a first value of an energy detection threshold,
sensing the second sub-channel, designated as the secondary channel, to determine when the second sub-channel is available for transmission by the communication device along with the first sub-channel, the sensing including determining whether energy detected by the communication device in the second sub-channel is below a second value of the energy detection threshold, wherein the second value of the energy detection threshold used for sensing the secondary channel is the same as the first value of the energy detection threshold used for sensing the primary channel, counting down a backoff counter while performing the sensing of the first sub-channel and the sensing of the second sub-channel, pausing the counting down of the backoff counter in response to determining, based on the sensing of the first sub-channel, that the first sub-channel is not available for transmission, pausing the counting down of the backoff counter in response to determining, based on the sensing of the second sub-channel, that the second sub-channel is not available for transmission, and resuming the counting down of the backoff counter when both i) determining, based on the sensing of the first sub-channel, that the first sub-channel is available for transmission, and ii) determining, based on the sensing of the second sub-channel, that the second sub-channel is available for transmission; and wherein the one or more IC devices are further configured to control the wireless network interface device to, in response to determining that i) the first sub-channel is available for transmission by the communication device and ii) the second sub-channel can be used for transmission by the communication device along with the first sub-channel, transmit the PPDU using the first sub-channel and the second sub-channel in the vehicular communication network in connection with the backoff counter reaching zero.

9. The communication device of claim 8, wherein the one or more IC devices are configured to generate the at least the portion of the PHY preamble i) based on an OFDM numerology that corresponds to a 156.25 kHz OFDM tone spacing and ii) using a down-clocking factor of two to generate at least a portion of the PHY preamble to have a 78.125 kHz OFDM tone spacing.

10. The communication device of claim 8, wherein:
the communication channel spans a first frequency bandwidth; and
the one or more IC devices are configured to generate the PHY preamble to further include a non-legacy portion decodable by a non-legacy communication device operating, in the vehicular communication network, using an operating channel that spans only a second frequency bandwidth smaller than the first frequency bandwidth.

11. The communication device of claim 10, wherein the one or more IC devices are configured to generate the PHY preamble to include a non-legacy signal field decodable by the non-legacy communication device operating, in the vehicular communication network, using the operating channel that spans only the second frequency bandwidth smaller than the first frequency bandwidth.

12. The communication device of claim 8, wherein the one or more IC devices are configured to transmit the PPDU in a communication channel having a center frequency between 5.8555 GHz and 5.925 GHz.

13. The communication device of claim 8, wherein
the communication device is configured to operate outside the context of a basic service set (OCB) in the vehicular communication network, and
the one or more IC devices are further configured to sense the second sub-channel of the communication channel after sensing the first sub-channel of the communication channel.

14. The communication device of claim 8, wherein the one or more IC devices are further configured to:
set a network allocation vector (NAV) timer in response to correctly decoding a valid signal received in either of i) the first sub-channel of the communication channel or ii) the second sub-channel of the communication channel; and
initiate the backoff counter in connection with an expiration of the NAV timer.

15. The communication device of claim 14, wherein the wireless network interface device includes:
the NAV timer implemented on one IC device among the one or more IC devices.

16. The communication device of claim 8, wherein the wireless network interface device includes:
the backoff counter implemented on one IC device among the one or more IC devices.

17. The communication device of claim 8, wherein the wireless network interface device includes:
one or more transceivers implemented on the one or more IC devices.

18. The communication device of claim 17, further comprising:
one or more antennas coupled to the one or more transceivers.

19. The communication device of claim 18, further comprising:
a host processor coupled to the wireless network interface device.

20. The communication device of claim 17, further comprising:
a host processor coupled to the wireless network interface device.

* * * * *